United States Patent
Chang et al.

(10) Patent No.: US 12,096,512 B2
(45) Date of Patent: Sep. 17, 2024

(54) METHOD AND APPARATUS FOR RELAYING PUBLIC SIGNALS IN COMMUNICATION SYSTEM

(71) Applicant: ELECTRONICS AND TELECOMMUNICATIONS RESEARCH INSTITUTE, Daejeon (KR)

(72) Inventors: Sung Cheol Chang, Daejeon (KR); Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 179 days.

(21) Appl. No.: 17/671,810

(22) Filed: Feb. 15, 2022

(65) Prior Publication Data
US 2022/0264280 A1    Aug. 18, 2022

(30) Foreign Application Priority Data

Feb. 15, 2021 (KR) .................... 10-2021-0020170
Apr. 1, 2021 (KR) .................... 10-2021-0042994
May 11, 2021 (KR) .................... 10-2021-0060481
Feb. 11, 2022 (KR) .................... 10-2022-0017986

(51) Int. Cl.
    *H04W 8/00*     (2009.01)
    *H04W 68/00*    (2009.01)
    *H04W 74/0833*  (2024.01)
    *H04W 88/04*    (2009.01)
    *H04W 92/18*    (2009.01)

(52) U.S. Cl.
    CPC ........ *H04W 8/005* (2013.01); *H04W 68/005* (2013.01); *H04W 74/0841* (2013.01); *H04W 88/04* (2013.01); *H04W 92/18* (2013.01)

(58) Field of Classification Search
    CPC .............. H04W 8/005; H04W 68/005; H04W 74/0841; H04W 88/04; H04W 92/18
    USPC ......................................................... 370/329
    See application file for complete search history.

(56) References Cited

U.S. PATENT DOCUMENTS

| | | | |
|---|---|---|---|
| 8,681,675 B2 | 3/2014 | Kim et al. | |
| 10,187,822 B2 | 1/2019 | Jeong et al. | |
| 10,225,860 B2 | 3/2019 | Jeong et al. | |
| 10,306,672 B2 | 5/2019 | Zhu et al. | |
| 10,602,512 B2 | 3/2020 | Ko et al. | |
| 10,862,565 B2 | 12/2020 | Kim et al. | |
| 10,893,535 B2 | 1/2021 | Kim et al. | |
| 2011/0141971 A1* | 6/2011 | Zhang | H04J 11/004 370/328 |
| 2017/0289986 A1 | 10/2017 | Jin et al. | |
| 2018/0092027 A1* | 3/2018 | Sheng | H04W 40/22 |
| 2019/0028962 A1* | 1/2019 | Chun | H04W 48/02 |
| 2020/0136871 A1 | 4/2020 | Kim et al. | |

(Continued)

FOREIGN PATENT DOCUMENTS

| | | |
|---|---|---|
| EP | 2309808 B1 | 7/2013 |
| KR | 10-1268658 B1 | 5/2013 |

*Primary Examiner* — Mark G. Pannell
(74) *Attorney, Agent, or Firm* — Rabin & Berdo, P.C.

(57) ABSTRACT

An operation method of a relay terminal for relaying radio communication between a base station and a remote terminal may comprise: recognizing a relay request of the remote terminal for system information provided by the base station; acquiring the system information from the base station; and transmitting the system information to the remote terminal.

11 Claims, 11 Drawing Sheets

(56) References Cited

U.S. PATENT DOCUMENTS

| | | | |
|---|---|---|---|
| 2021/0006318 A1 | 1/2021 | Kim et al. | |
| 2022/0116982 A1* | 4/2022 | Lee | H04W 72/23 |
| 2022/0124475 A1* | 4/2022 | Kang | H04W 72/20 |
| 2022/0141756 A1* | 5/2022 | Pan | H04W 48/12 |
| | | | 370/328 |
| 2022/0312535 A1* | 9/2022 | Wu | H04W 48/12 |
| 2023/0023639 A1* | 1/2023 | Shi | H04W 88/04 |
| 2023/0308991 A1* | 9/2023 | Zhang | H04W 48/14 |
| 2023/0388904 A1* | 11/2023 | Wei | H04W 48/14 |
| 2024/0008058 A1* | 1/2024 | Chang | H04W 76/23 |

* cited by examiner

METHOD AND APPARATUS FOR RELAYING PUBLIC SIGNALS IN COMMUNICATION SYSTEM

CROSS-REFERENCE TO RELATED APPLICATIONS

This application claims priority to Korean Patent Applications No. 10-2021-0020170 filed on Feb. 15, 2021, No. 10-2021-0042994 filed on Apr. 1, 2021, No. 10-2021-0060481 filed on May 11, 2021, and No. 10-2022-0017986 filed on Feb. 11, 2022, with the Korean Intellectual Property Office (KIPO), the entire contents of which are hereby incorporated by reference.

BACKGROUND

1. Technical Field

The present disclosure relates to a technique for relaying common signals in a communication system, and more particularly, to a technique for relaying common signals in a communication system, which enables relaying common signals through sidelinks.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and Massive Machine Type Communication (mMTC).

In such the communication system, a sidelink may be configured between terminals. In this manner, a terminal (i.e., relay terminal) adjacent to a base station among terminals configured with the sidelink may relay data communication between another terminal (i.e., remote terminal) and the base station. In this case, the relay terminal may need to deliver a common signal to the remote terminal.

SUMMARY

In order to solve the above-identified problems, exemplary embodiments of the present disclosure are directed to providing a method and an apparatus for relaying common signals in a communication system, which allow a relay terminal to relay common signals between a base station and a remote terminal through sidelinks.

According to a first exemplary embodiment of the present disclosure for achieving the above-described objective, an operation method of a relay terminal for relaying radio communication between a base station and a remote terminal may comprise: recognizing a relay request of the remote terminal for system information provided by the base station; acquiring the system information from the base station; and transmitting the system information to the remote terminal.

The recognizing of the relay request of the remote terminal may comprise: receiving, from the remote terminal, a request message notifying the relay request for the system information; and recognizing the relay request for the system information from the received request message.

The recognizing of the relay request of the remote terminal may comprise: receiving, from the base station, relay request identification information capable of identifying the relay request of the remote terminal for the system information; receiving, from the remote terminal, a discovery message including the relay request identification information; and recognizing the relay request for the system information by acquiring the relay request identification information from the received discovery message.

The relay request identification information may be an identifier for a request logical channel used by the remote terminal to transmit the discovery message to request transmission of the system information.

The relay request identification information may be information on a request discovery resource used by the remote terminal to transmit the discovery message to request transmission of the system information.

The acquiring of the system information from the base station may comprise: requesting the base station to transmit the system information; and receiving, from the base station, the system information in response to the transmission request.

The requesting the base station to transmit the system information may comprise: selecting a first physical random access channel (PRACH) sequence requesting transmission of the system information, which is designated by the base station, among PRACH sequences; and transmitting the first PRACH sequence to the base station on a PRACH.

The operation method may further comprise: receiving, from the remote terminal, a relay stop request for the system information; and stopping transmission of the system information according to the relay stop request.

According to a second exemplary embodiment of the present disclosure for achieving the above-described objective, an operation method of a relay terminal for relaying radio communication between a base station and a remote terminal may comprise: receiving, from the remote terminal, association information of a paging occasion for receiving a paging message destined for the remote terminal; receiving the paging message from the base station by performing a monitoring operation on the paging occasion indicated by the association information; determining a destination of the paging message based on information included in the paging message; and transmitting the paging message to the remote terminal when the destination of the paging message is the remote terminal.

The association information may include an identifier of the remote terminal, and the receiving of the paging message from the base station may comprise: performing a monitoring operation on a paging occasion associated with the identifier of the remote terminal; and receiving the paging message from the base station in the paging occasion.

The association information may include an identifier of the remote terminal and a discontinuous reception (DRX) cycle of the remote terminal, and the receiving of the paging message from the base station may comprise: performing a monitoring operation on the paging occasion associated with the identifier of the remote terminal and the DRX cycle; and receiving the paging message from the base station in the paging occasion.

The operation method may further comprise, when the association information includes an identifier of the remote terminal, transmitting the identifier of the remote terminal to the base station.

In the transmitting of the paging message to the remote terminal, the relay terminal may transmit the paging message to the remote terminal by using a unicast transmission scheme, a broadcast transmission scheme, or a groupcast transmission scheme.

The operation method may further comprise: receiving, from the remote terminal, a relay stop request for the paging message; and stopping relaying of the paging message destined for the remote terminal according to the relay stop request.

According to a third exemplary embodiment of the present disclosure for achieving the above-described objective, a relay terminal for relaying radio communication between a base station and a remote terminal in a communication system may comprise: a processor; a memory electronically communicating with the processor; and instructions stored in the memory, wherein when executed by the processor, the instructions cause the relay terminal to: recognize a relay request of the remote terminal for system information provided by the base station; acquire the system information from the base station; and transmit the system information to the remote terminal.

In the recognizing of the relay request of the remote terminal, the instructions may cause the relay terminal to: receive, from the remote terminal, a request message notifying the relay request for the system information; and recognize the relay request for the system information from the received request message.

In the recognizing of the relay request of the remote terminal, the instructions may cause the relay terminal to: receive, from the base station, relay request identification information capable of identifying the relay request of the remote terminal for the system information; receive, from the remote terminal, a discovery message including the relay request identification information; and recognize the relay request for the system information by acquiring the relay request identification information from the received discovery message.

The relay request identification information may be an identifier for a request logical channel used by the remote terminal to transmit the discovery message to request transmission of the system information.

The relay request identification information may be information on a request discovery resource used by the remote terminal to transmit the discovery message to request transmission of the system information.

According to the present disclosure, a remote terminal may request a relay terminal to relay transmission of system information from a base station by using a request message. In addition, according to the present disclosure, the remote terminal may request the relay terminal to relay transmission of system information from the base station by using a request notifier. In addition, according to the present disclosure, the remote terminal may request the relay terminal to relay transmission of system information from the base station by using a request logical channel while performing a discovery procedure with the relay terminal. In addition, according to the present disclosure, the remote terminal may request relay the relay terminal to relay transmission of system information from the base station by using a request discovery resource. Accordingly, the relay terminal may receive the request for relaying system information of the base station from the remote terminal, acquire system information from the base station, and deliver the acquired system information to the remote terminal. As such, the relay terminal may relay the system information between the base station and the remote terminal. Accordingly, the remote terminal can acquire the system information of the base station through the relay terminal even when the remote terminal is out of a communication coverage of the base station.

Meanwhile, according to the present disclosure, the remote terminal may request the relay terminal to relay transmission of a paging message. Accordingly, the relay terminal may receive a paging message for the remote terminal from the base station and transmit the received paging message to the remote terminal. In this case, the base station may reduce paging occasions for the relay terminal to perform a reception operation by using a paging notifier. In addition, the base station may reduce paging occasion by transmitting a paging message for paging the remote terminal in a paging occasion associated with or mapped to an identifier of the relay terminal. Accordingly, as the base station reduces the paging occasions which the relay terminal should monitor, power consumption of the relay terminal can be reduced.

DETAILED DESCRIPTION OF THE EMBODIMENTS

Figure 1:
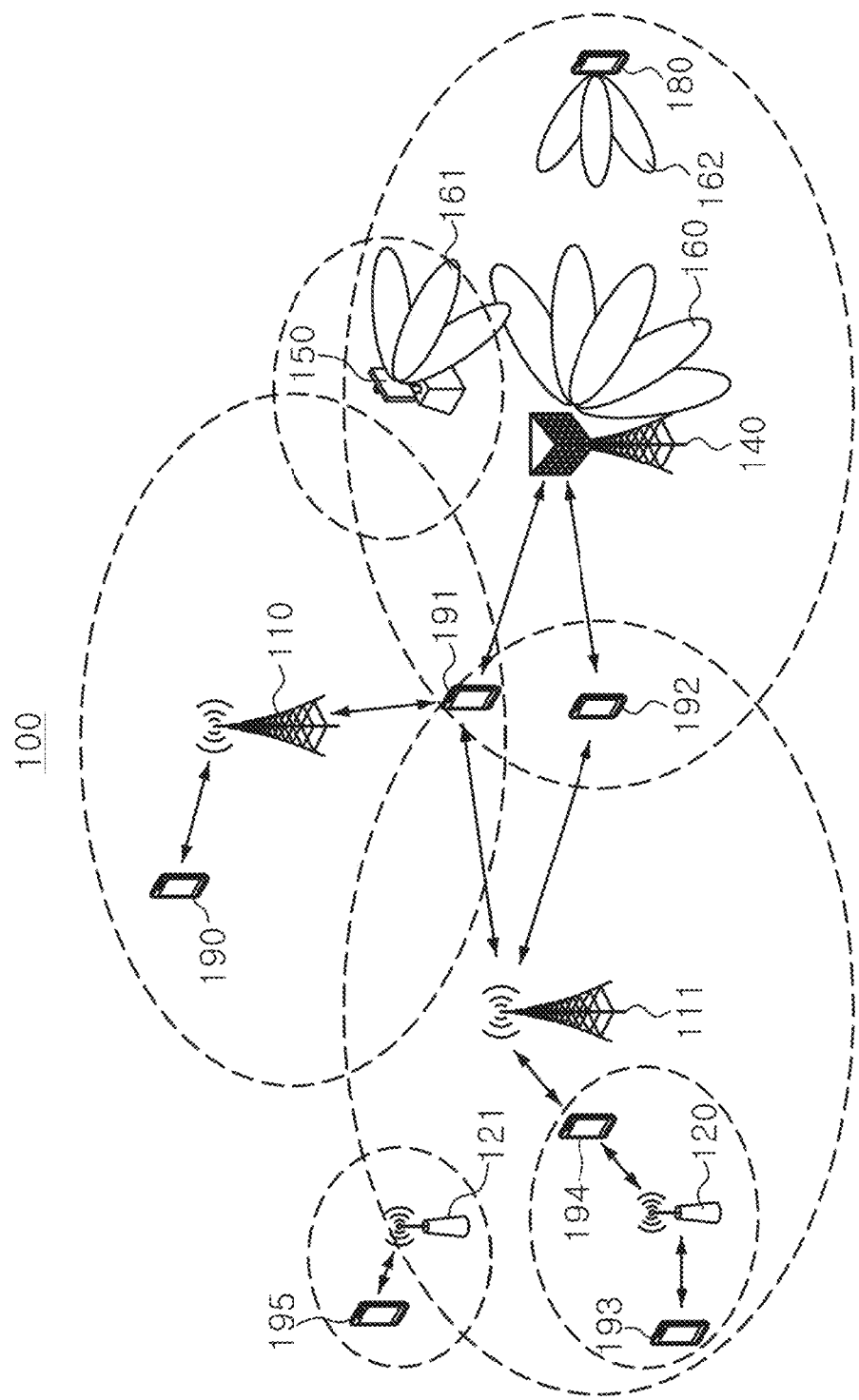
FIG. 1 is a conceptual diagram illustrating a first exemplary embodiment of a wireless communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the wireless communication network may have the same meaning as a wireless communication system.

FIG. 1 is a conceptual diagram illustrating a first exemplary embodiment of a wireless communication network.

Referring to FIG. 1, a wireless communication network 100 may comprise a plurality of communication nodes 110, 111, 120, 121, 140, 150, 180, 190, 191, 192, 193, 194, and 195. Each of the plurality of communication nodes may support at least one communication protocol. For example, each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, orthogonal frequency division multiple access (OFDMA) based communication protocol, single carrier FDMA (SC-FDMA) based communication protocol, non-orthogonal multiple access (NOMA) based communication protocol, space division multiple access (SDMA) based communication protocol, or the like.

The wireless communication network 100 may include a plurality of base stations (BSs) 110, 111, 120, 121, 140, and 150, a plurality of terminals (i.e., user equipments (UEs)) 190, 191, 192, 193, 194, 195, and 180. Each of the plurality of base stations 110, 111, and 140 may form a macro cell. Each of the plurality of base stations 120, 121, and 150 may form a small cell. The plurality of terminals 190 and 191 may belong to a cell coverage of the base station 110. The plurality of base stations 120 and 121 and the plurality of terminals 191, 192, 193, 194 and 195 may belong to a cell coverage of the base station 111. The base station 150 and the plurality of terminals 191, 192, and 180 may belong to a cell coverage of the base station 140.

Each of the plurality of communication nodes 110, 111, 120, 121, 140, 150, 180, 190, 191, 192, 193, 194, and 195 may support radio access protocol specifications of a radio access technology based on cellular communications (e.g., the long term evolution (LTE), LTE-Advanced (LTE-A), new radio (NR), etc. defined in the $3^{rd}$ generation partnership project (3GPP)). Each of the plurality of base stations 110, 111, 120, 121, 140, and 150 may operate in a different frequency band or may operate in the same frequency band. The plurality of base stations 110, 111, 120, 121, 140, and 150 may be connected to each other through an ideal backhaul or a non-ideal backhaul, and may exchange information with each other through the ideal backhaul or non-ideal backhaul. Each of the plurality of base stations 110, 111, 120, 121, 140, and 150 may be connected to a core network (not shown) through the backhaul. Each of the plurality of base stations 110, 111, 120, 121, 140, and 150 may transmit data received from the core network to a corresponding terminal 190, 191, 192, 193, 194, 195, or 180, and the corresponding terminal 190, 191, 192, 193, 194, 195, and 180 may transmit the received data to the core network.

Each of the plurality of communication nodes 110, 111, 120, 121, 140, 150, 180, 190, 191, 192, 193, 194, and 195 constituting the wireless communication network 100 may exchange signals with other communication nodes without interference by using a beam formed based on a multi-antenna.

Each of the plurality of base stations 110, 111, 120, 121, 140, and 150 may support multiple input multiple output (MIMO) transmission using multiple antennas (e.g., single user (SU)-MIMO, multi-user (MU)-MIMO, massive MIMO, etc.), coordinated multipoint (CoMP) transmission of multiple transmission/reception points, carrier aggregation (CA) transmission, unlicensed band transmission, direct-to-device (D2D) communication, proximity services (ProSe), dual connectivity transmission, and/or the like.

Each of the plurality of base stations 110, 111, 120, 121, 140, and 150 may be referred to as a NodeB, a evolved NodeB, gNB, ng-eNB, radio base station, access point, access node, node, radio side unit (RSU), or the like. Each of the plurality of terminals 190, 191, 192, 193, 194, 195, and 180 may be referred to as a user equipment (UE), terminal, access terminal, mobile terminal, station, subscriber station, mobile station, portable subscriber station, node, device, internet of things (IoT) device, mounted module/device/terminal or on-board device/terminal, or the like.

Each of the plurality of communication nodes 110, 111, 120, 121, 140, 150, 180, 190, 191, 192, 193, 194, and 195 may support radio access protocol specifications of a radio access technology based on cellular communications (e.g., LTE, LTE-A, etc. defined in the 3GPP). Each of the plurality of base stations 110, 111, 120, 121, 140, and 150 may operate in a different frequency band or may operate in the same frequency band. The plurality of base stations 110, 111, 120, 121, 140, and 150 may be connected to each other through an ideal backhaul or a non-ideal backhaul, and may exchange information with each other through the ideal backhaul or non-ideal backhaul. Each of the plurality of base stations 110, 111, 120, 121, 140, and 150 may be connected to a core network (not shown) through the backhaul. Each of the plurality of base stations 110, 111, 120, 121, 140, and 150 may transmit data received from the core network to a corresponding terminal 190, 191, 192, 193, 194, 195, or 180, and the corresponding terminal 190, 191, 192, 193, 194, 195, and 180 may transmit the received data to the core network.

Each of the plurality of base stations 110, 111, 120, 121, 140, and 150 may support OFDMA-based downlink transmission and may support SC-FDMA-based uplink transmission. Each of the plurality of base stations 110, 111, 120, 121, 140, and 150 may support MIMO transmission (e.g., SU-MIMO, MU-MIMO, massive MIMO, etc.), CoMP transmission, CA transmission, unlicensed band transmission, D2D communication (or, proximity services (ProSe)), and/or the like. Here, each of the plurality of terminals 190, 191, 192, 193, 194, 195, and 180 may perform an operation corresponding to the base station 110, 111, 120, 121, 140, or 150, and an operation supported by the base station 110, 111, 120, 121, 140, and 150.

The content of the present disclosure is not limited to the above-mentioned terms, and the terms may be substituted with other terms representing entities performing the corresponding functions according to a radio access protocol based on a radio access technology (RAT) and a function configuration supporting the same.

Figure 2:
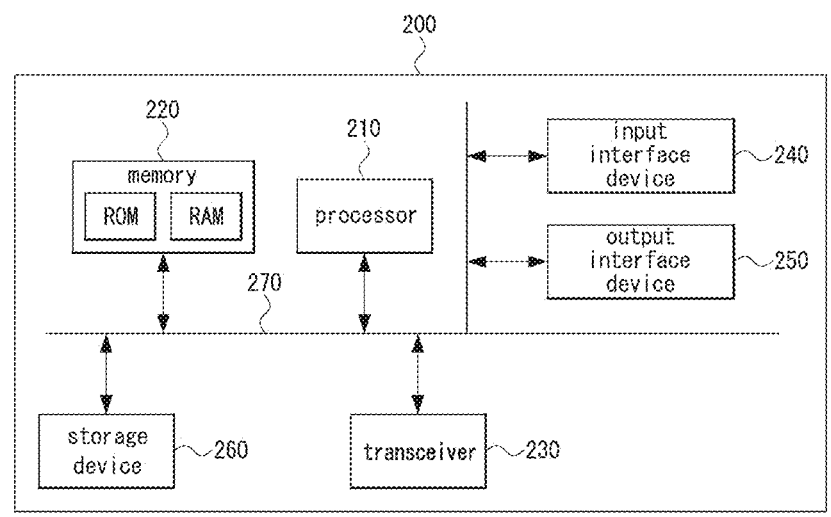
FIG. 2 is a block diagram illustrating a first exemplary embodiment of a communication node constituting a wireless communication network.

FIG. 2 is a block diagram illustrating a first exemplary embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Each of the plurality of communication nodes 110, 111, 120, 121, 140, 150, 180, 190, 191, 192, 193, 194, and 195 constituting the wireless communication network 100 and each of a plurality of communication nodes described in the present disclosure may be configured identically or similarly to the communication node 200.

Hereinafter, a structure of a radio access protocol that provides radio access between a base station and a terminal in a wireless communication network and a function of each layer will be described. The following description on the structure and function of each layer of the radio access protocol is merely an example for convenience of description of specific exemplary embodiments of the present disclosure, and is not intended to limit the exemplary embodiments of the present disclosure. The exemplary embodiments of the present disclosure may include the concept of the proposed technology and may include modifications or substitutions thereof in the scope.

The radio access protocol may provide functions for a plurality of communication nodes to exchange data and control information by utilizing radio resources in a wireless section, and may be configured hierarchically. In cellular communications (e.g., LTE, LTE-Advanced (LTE-A), NR, and/or the like which are the 3GPP specifications), the radio access protocol may be composed of 1) a radio layer 1 (RL1) configuring physical signals, 2) a radio layer 2 (RL2) that controls radio transmission in radio resources shared by a plurality of communication nodes, and transmits and converges data to a counterpart node, and 3) a radio layer 3 (RL3) that performs radio resource control, such as network information sharing, radio connection management, mobility management, and quality-of-service (QoS) management for a plurality of communication nodes participating in the wireless network.

The radio layer 1 may be a physical layer and may provide functions for data delivery. The radio layer 2 may be composed of sublayers such as a medium access control (MAC) layer, radio link control (RLC) layer, packet data convergence protocol (PDCP) layer, service data adaptation protocol (SDAP) layer, and/or the like. The radio layer 3 may be a radio resource control (RRC) layer and may provide access stratum (AS) layer control functions.

Operations such as a start, stop, reset, restart, or expire of a timer defined in relation to an operation of the timer defined or described in the present disclosure may mean or include the operation of the timer or a counter for the corresponding timer without being separately described.

Hereinafter, operation methods of communication nodes in a wireless communication network will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, a sidelink may be a wireless connection for transmitting data between terminals. Transmission of the data may be performed in such a manner that a terminal receives a radio signal transmitted by a counterpart terminal. A method in which transmitting and receiving terminals use the same resource at the same time in an environment where a plurality of terminals use the same radio frequency may be used. The transmitting terminal may provide resource information to the receiving terminal.

A sidelink function in mobile communication may be configured with an interface between the terminals and an interface between at least one terminal and a sidelink server. Here, the sidelink server may provide information related to sidelink communication to the terminal. A base station may be included in a communication path between the sidelink server and the terminal, and may mutually deliver packets exchanged between the terminal and the sidelink server. In the 3GPP radio access, the sidelink may include a PC5 interface between the terminals, and may include a PC3 interface between the terminal and the sidelink server.

A terminal that is a subject of sidelink transmission/reception may transmit/receive data for discovering neighboring terminals. The procedure for discovering neighboring terminals may be required prior to configuring a sidelink consisting of a pair of adjacent terminals. The sidelink server may collect information on neighboring terminals and may have the information on neighboring terminals with respect to a specific terminal.

The transmitting terminal may exchange request/report messages with the sidelink server that stores information on the discovered terminals. The sidelink server may request a transmitting terminal to transmit a discovery message. Accordingly, the transmitting terminal may receive the transmission request of a discovery message from the sidelink server. Then, the transmitting terminal may transmit a discovery message to neighboring terminals. As a result, a neighboring terminal may receive the discovery message and may transmit a discovery response message to the transmitting terminal in response thereto. The transmitting terminal may receive the discovery response message from the neighboring terminal, thereby identifying the neighboring terminal. Thereafter, the transmitting terminal may report response information included in the received discovery response message to the sidelink server. As another discovery method, the transmitting terminal may request neighboring terminals to transmit a discovery message. Accordingly, a neighboring terminal may receive the transmission request of a discovery message, and may transmit a discovery message to the transmitting terminal in response thereto. The transmitting terminal may receive the discovery message from the neighboring terminal, thereby identifying the neighboring terminal.

The transmitting terminal of the sidelink may transmit control information for allocation of a resource to be used to the receiving terminal. In this case, the base station may allocate the resource to be used by the transmitting terminal. In this case, the transmitting terminal may request resource configuration from the base station. Then, the base station may select a resource, and allocate the resource to the transmitting terminal by transmitting resource allocation information to the transmitting terminal. The transmitting terminal may transmit control information including information on the resource and information on data to the receiving terminal by using the allocated resource. The receiving terminal may identify the allocated resource from the received control information, and may receive the data by using the identified resource. In this manner, the transmitting and receiving terminals may exchange data through the sidelink. Alternatively, the transmitting terminal may autonomously allocate the resource to be used by the transmitting terminal. This scheme may be a scheme in which the transmitting terminal arbitrarily selects the resource to be used for transmission and reception. After selecting the resource, the transmitting terminal may exchange data with the receiving terminal through the sidelink by using the selected resource.

In the sidelink, radio resources may be operated on a channel basis according to a usage. Physical channels of the sidelink may include at least one of a physical sidelink broadcast channel (PSBCH) for transmitting broadcast information through the sidelink, a physical sidelink control channel (PSCCH) for transmitting sidelink control information, a physical sidelink shared channel (PSSCH) for transmitting data, and a physical sidelink feedback channel (PSFCH) transmitted by a receiving side for received data. As synchronization signals in the sidelink, at least one of a sidelink primary synchronization signal (S-PSS), a sidelink secondary synchronization signal (S-SSS), and a channel state information reference signal (CSI-RS) for sidelink channel measurement may be used.

The receiving terminal receiving the data transmitted by the transmitting terminal through the sidelink may inform the transmitting terminal of whether the data has been received. A PSFCH for transmitting whether the data has been received may be used by one terminal or shared and used by a plurality of terminals. In a one-to-one transmission scheme where one transmitting terminal and one receiving terminal configure a sidelink, the receiving terminal may use the PSFCH. In a one-to-many transmission scheme where one transmitting terminal and a plurality of receiving terminals configure a sidelink, the plurality of receiving terminals may share the PSFCH. Here, the sharing scheme may include a scheme of transmitting the PSFCH in case of acknowledgement (ACK) and a scheme of transmitting the PSFCH in case of negative ACK (NACK or non-ACK).

A relay terminal (i.e., relay UE) may relay data between a network and a remote terminal (i.e., remote UE). The relay terminal may access the remote terminal through a sidelink, and may exchange data with the remote terminal by using the sidelink. The relay terminal may access the base station by using a Uu interface, and may exchange data with the network by using the Uu interface. The remote terminal may exchange data with the network via the relay terminal. The remote terminal may access the sidelink. The remote terminal may be located within a coverage of the base station. Alternatively, the remote terminal may be located outside the coverage of the base station.

Figure 3:
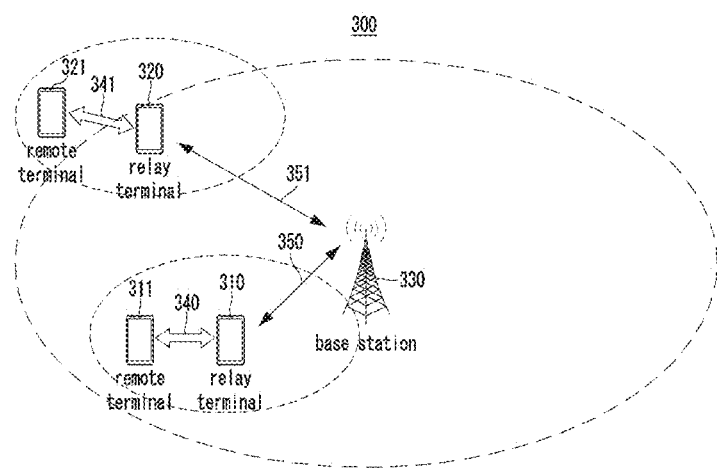
FIG. 3 is a conceptual diagram illustrating a first exemplary embodiment of a data relaying method of a relay terminal.

FIG. 3 is a conceptual diagram illustrating a first exemplary embodiment of a data relaying method of a relay terminal.

Referring to FIG. 3, a first remote terminal 311 may be connected to a network by accessing a first sidelink 340. A first relay terminal 310 may be connected to the first sidelink 340 and perform a function of relaying data using a first Uu interface 350. In addition, a second remote terminal 321 may be connected to the network by accessing a second sidelink 341. A second relay terminal 320 may be connected to the second sidelink 341 and perform a function of relaying data using a second Uu interface 351. The first and second relay terminals 310 and 320 may be located in a coverage provided by a base station 330. Also, the first remote terminal 311 may be located within the coverage provided by the base station 330. Unlike the first remote terminal 311, the second remote terminal 321 may be located outside the coverage.

System Information Reception of a Relay Terminal Through a Uu Link

The relay terminal may receive system information provided by the base station in the coverage of the base station. A method for the relay terminal to receive system information through the Uu interface between the base station and the relay terminal may vary depending on a type of the system information. When the type of system information is a periodic-type (i.e., periodic system information), the base station may periodically broadcast the system information. The relay terminal may receive the system information periodically broadcast by the base station. The base station may divide the system information into groups having different periodicities of broadcasting. In addition, the base station may broadcast system information belonging to a group for each periodicity corresponding to the group. The relay terminal may acquire system information by receiving the system information broadcast for each periodicity. The system information broadcast for each periodicity may be determined and periodically broadcast by the base station without a request from the relay terminal.

In contrast, when the type of system information is an on-demand type (i.e., on-demand system information), the base station may transmit the system information to the relay terminal according to a request from the relay terminal. The relay terminal may request the base station to transmit on-demand system information. In this case, the relay terminal may request the base station to transmit on-demand system information by using a sequence or a message. The scheme of using a sequence may be a scheme of using a sequence in a PRACH. The base station may designate a request sequence that can be used for the purpose of requesting on-demand system information, and the base station may inform the relay terminal of the designated request sequence. Then, the relay terminal may receive information on the request sequence from the base station.

The relay terminal may transmit the request sequence to the base station for the purpose of requesting on-demand system information. Accordingly, the base station may receive the request sequence from the relay terminal, and may transmit on-demand system information corresponding to the received request sequence to the relay terminal. Accordingly, the relay terminal may receive the on-demand system information from the base station. Alternatively, the relay terminal may transmit a message to the base station for the purpose of requesting on-demand system information. Accordingly, the base station may receive the message from the relay terminal, and may transmit on-demand system information requested in the received message to the relay terminal. Accordingly, the relay terminal may receive the on-demand system information from the base station.

The base station may transmit the on-demand system information in a broadcast transmission scheme. That is, the base station may broadcast the on-demand system information. Then, the relay terminal may receive the on-demand system information broadcast from the base station. As such, the on-demand system information transmitted in the broadcast transmission scheme may be utilized by not only the relay terminal but also all terminals receiving the on-demand system information. Alternatively, the base station may transmit the on-demand system information in a unicast transmission scheme. In the unicast transmission scheme, the base station may identify the relay terminal that has transmitted the request message in the process of receiving the request message requesting transmission of system information. Then, the base station may transmit the on-demand system information to the corresponding relay terminal in response to the request message. Accordingly, the relay terminal may receive the on-demand system information from the base station. As such, when the base station transmits the on-demand system information in the unicast transmission scheme, a destination of the system information may be the relay terminal that has transmitted the request message. In this case, the relay terminal may receive the on-demand system information in the Uu interface in the same manner as a general terminal receives system information. Meanwhile, the remote terminal may receive system information from the base station by performing the same system information reception operation performed by the relay terminal in the Uu link.

System Information Request Through a Sidelink

The remote terminal may access the base station via the relay terminal. To this end, the remote terminal may acquire, from the relay terminal, sidelink system information configured and delivered by the base station to the relay terminal. Here, the sidelink system information may be broadcast-type system information. The relay terminal may periodically broadcast the sidelink system information on a sidelink broadcast channel (PSBCH).

When the remote terminal is in a region in which a signal broadcast by the relay terminal can be received, the remote terminal may periodically receive the sidelink broadcast channel to acquire the sidelink system information. The sidelink system information may include parameters required for the remote terminal to access a sidelink. In addition, the sidelink system information may include parameters required for the remote terminal to access the base station via the relay terminal. Here, the parameters required for the remote terminal to access the sidelink and the parameters required for the remote terminal to access the base station via the relay terminal may be referred to as 'sidelink configuration information'.

As described above, the relay terminal may configure the sidelink configuration information, which is required for the remote terminal to access the relay terminal through the sidelink and required for the remote terminal to access the base station via the relay terminal, as the sidelink system information. Then, the relay terminal may periodically broadcast the configured sidelink system information through the sidelink. The remote terminal may receive the sidelink system information periodically broadcast by the relay terminal, and may utilize the sidelink system information in a procedure for accessing the relay terminal. In this manner, the remote terminal may acquire the sidelink system information from the sidelink, and the remote terminal may access the base station via the relay terminal by using the acquired sidelink system information.

Here, the sidelink configuration information may include physical resource information and resource access information related to a sidelink configuration for enabling the remote terminal to access the sidelink and transmit a physical signal through the sidelink. The remote terminal may receive the sidelink system information transmitted from the relay terminal or the base station, and obtain the physical resource information and resource access information (i.e., sidelink configuration information) related to the sidelink configuration from the received sidelink system information. Alternatively, the sidelink configuration information may be preconfigured and stored in the remote terminal.

On the other hand, the remote terminal may request the relay terminal to transmit on-demand system information. The relay terminal may receive, from the remote terminal, the transmission request of on-demand system information through the sidelink, and the relay terminal may transmit system information to the remote terminal in response thereto. Accordingly, the remote terminal may receive the on-demand system information from the relay terminal. As such, the on-demand system information may have a characteristic of being transmitted by the relay terminal as a response after the remote terminal initiates the request procedure. In this case, the remote terminal may request the relay terminal to transmit the on-demand system information by using a request message. The relay terminal may receive, from the remote terminal, the request message requesting transmission of on-demand system information. Then, the relay terminal may transmit, to the remote terminal, the on-demand system information requested using the request message.

Meanwhile, the remote terminal may transmit a request notifier to the relay terminal in order to request on-demand system information from the relay terminal. The request notifier may be mapped to a signal transmitted in a specific position or specific resource through the sidelink. The resource in which the request notifier is transmitted may be repeated periodically. Alternatively, the resource in which the request notifier is transmitted may be configured in a periodically repeated pattern. Such the request notifier may be notified by the relay terminal to the remote terminal through the sidelink configuration information. In this manner, the remote terminal may obtain information on the request notifier from the sidelink configuration information obtained from the relay terminal. The remote terminal may transmit the request notifier to the relay terminal at a time when it is decided to request on-demand system information. The relay terminal may receive the request notifier from the remote terminal, and thus may identify the transmission request of on-demand system information. The request notifier may be configured identically to a plurality of remote terminals due to a feature of being mapped to a specific position or resource. That is, a plurality of remote terminals may transmit the request notifiers at the same time. Accordingly, the relay terminal may receive the request notifiers and transmit on-demand system information through the sidelink in a broadcast scheme. As such, the relay terminal may transmit system information to a plurality of remote terminals in the broadcast transmission scheme.

Meanwhile, the remote terminal may transmit a discovery message including the request notifier to the relay terminal in order to request on-demand system information from the relay terminal. The relay terminal and the remote terminal capable of accessing the sidelink may exchange discovery messages with each other for the purpose of discovering each other. The relay terminal or the remote terminal may transmit the discovery message in a configured resource. When the relay terminal or the remote terminal receives the discovery message, it may transmit a discovery response message in response thereto. In this case, the discovery message and the discovery response message may be identical to each other. Alternatively, the discovery message and the discovery response message may be configured as a request/response pair. The relay terminal or the remote terminal may transmit the discovery message including the request notifier. In particular, the remote terminal may transmit the discovery message including the request notifier to the relay terminal. Then, the relay terminal may receive the discovery message including the request notifier, and identify the transmission request of on-demand system information from the remote terminal. Accordingly, the relay terminal may transmit the on-demand system information according to the request notifier to the remote terminal by including it in the discovery response message. The remote terminal may receive the discovery response message, and acquire the on-demand system information included in the discovery response message.

Meanwhile, the remote terminal may differently configure a logical channel on which the discovery message is transmitted to request on-demand system information from the relay terminal. The remote terminal may configure the logical channel for transmitting the discovery message including the request of system information differently from a logical channel for transmitting a general discovery message.

As such, the logical channel configured differently from the logical channel used for the remote terminal to transmit a general discovery message may be referred to as a 'request logical channel'. Accordingly, the remote terminal may transmit, to the relay terminal, the discovery message requesting on-demand system information from the relay terminal through the request logical channel. Here, the request logical channel may be distinguished from the logical channel for transmitting a general discovery message used when there is no request. To this end, the remote terminal may configure the discovery message including a MAC protocol data unit (PDU) including a request logical channel identifier. Then, the remote terminal may transmit the discovery message to the relay terminal in a resource of the sidelink. The relay terminal may receive the discovery message through the sidelink and may obtain the logical channel identifier from the MAC PDU included in the received discovery message. Accordingly, the relay terminal may identify that it is the request logical channel and may identify the request for transmission of on-demand system information. Accordingly, the relay terminal may transmit on-demand system information to the remote terminal by including the on-demand system information in the discovery response message. The remote terminal may receive the discovery response message and acquire the on-demand system information included in the discovery response message.

Meanwhile, the remote terminal may differently configure a transmission resource in which the discovery message is transmitted to request on-demand system information from the relay terminal. As such, the remote terminal may configure the sidelink resource for transmitting the discovery message differently from a sidelink resource for transmitting a general discovery message. As such, the sidelink resource for transmitting the discovery message may be classified into a general discovery resource for transmitting a general discovery message and a request discovery resource for transmitting a discovery message requesting system information. In addition, the relay terminal and the remote terminal may share identification information for distinguishing between a general discovery resource and a request discovery resource. The remote terminal may transmit the discovery message to the relay terminal using the requested discovery resource in order to request on-demand system information from the relay terminal. The relay terminal may receive the discovery message in the request discovery resource. In addition, the relay terminal may identify the request for transmission of on-demand system information from the remote terminal when the discovery message is received in the request discovery resource. Accordingly, the relay terminal may transmit the on-demand system information to the remote terminal by including the on-demand system information in the discovery response message. The remote terminal may acquire the on-demand system information included in the discovery response message by receiving the discovery response message.

Meanwhile, the remote terminal may configure a request message to request on-demand system information from the relay terminal. The remote terminal may transmit the configured request message to the relay terminal by sharing the resource in which the discovery message is transmitted. The request message transmitted by sharing the resource in which the discovery message is transmitted may be distinguished from a general discovery message by differentiating message identifiers thereof. That is, a message identifier included in the request message may be different from a message identifier included in the general discovery message. The remote terminal may transmit the request message including a message identifier different from a message identifier of the general discovery message to the relay terminal by using the resource for transmitting the discovery message. Accordingly, the relay terminal may receive the request message in the resource through which the discovery message is transmitted. In addition, it may be identified that the received message is the request message based on the message identifier included in the received request message. Accordingly, the relay terminal may identify the request for transmission of on-demand system information from the remote terminal. Accordingly, the relay terminal may transmit on-demand system information to the remote terminal by including the on-demand system information in the discovery response message. The remote terminal may receive the discovery response message and acquire the on-demand system information included in the discovery response message. Additionally, the remote terminal may transmit the request message to the relay terminal by using a logical channel distinguished from the logical channel through which the discovery message is transmitted.

In addition, the remote terminal may transmit the configured request message to the relay terminal by using a separate resource without sharing the resource through which the discovery message is transmitted. Accordingly, the relay terminal may receive the request message through a resource separate from the resource through which the discovery message is transmitted. Then, the relay terminal may identify the request for transmission of on-demand system information from the remote terminal. Accordingly, the relay terminal may transmit on-demand system information to the remote terminal through a response message different from the discovery response message. Of course, the relay terminal may transmit the on-demand system information to the remote terminal by including the on-demand system information in the discovery response message.

On-Demand System Information Procedures

The remote terminal and the relay terminal may acquire system information through a signaling procedure in the sidelink. In addition, the remote terminal and the relay terminal may perform a subsequent sidelink connection establishment procedure by using the system information acquired from the sidelink. That is, in case of the broadcast-type system information, the relay terminal may periodically broadcast the system information. In addition, the remote terminal may acquire the broadcast system information and perform the sidelink connection establishment procedure. Alternatively, in case of the on-demand system information, the remote terminal may request transmission of system information to the relay terminal. Accordingly, the relay terminal may receive the request for transmission of system information from the remote terminal. Then, the relay terminal may transmit system information to the remote terminal in response thereto. Meanwhile, each of the remote terminal and the relay terminal may perform the subsequent sidelink connection establishment procedure using the stored system information.

In the RRC idle state, the remote terminal may move to a communication coverage of another relay terminal. Alternatively, the remote terminal may move to a communication coverage of another base station in the RRC idle state. In this case, the remote terminal may attempt a sidelink access to access a new relay terminal or a new base station. The remote terminal may request system information for a sidelink access to the relay terminal or the base station. The relay terminal may receive the request for transmission of system information from the remote terminal, and in response thereto, the relay terminal may transmit on-demand system information to the remote terminal.

The relay terminal may transmit the on-demand system information to the remote terminal in the broadcast transmission scheme or the unicast transmission scheme. In the broadcast transmission scheme, the relay terminal may transmit the system information to the remote terminal by using a broadcast identifier that can be received by a plurality of terminals including the remote terminal. In the unicast transmission scheme, the relay terminal may transmit system information to the corresponding remote terminal by using an identifier of the remote terminal. Accordingly, the remote terminal may receive the system information. In addition, the remote terminal may perform the sidelink connection establishment procedure by accessing the sidelink based on the received system information.

Meanwhile, the remote terminal in the RRC connected state may request the relay terminal to transmit system information in order to acquire system information that has not been obtained. In this case, the remote terminal may request the relay terminal to transmit system information by transmitting an RRC message including request information to the relay terminal. Accordingly, the relay terminal may receive the RRC message including the request information for requesting system information from the remote terminal, and the relay terminal may transmit an RRC message including system information to the remote terminal in response thereto. Accordingly, the remote terminal may receive the RRC message including system information, and may acquire the system information included in the received RRC message.

Discovery Procedure

The remote terminal may transmit the request information to the relay terminal in conjunction with a discovery procedure. The remote terminal and the relay terminal may allow the request information for requesting system information to be included in a discovery message used in the discovery procedure for mutual discovery. In this case, the request information may be included in the discovery message and transmitted from the remote terminal to the relay terminal. Alternatively, the request information may be transmitted from the remote terminal to the relay terminal through a logical channel using a request logical channel identifier separated from a logical channel through which a general discovery message is transmitted. Alternatively, the request information may be transmitted from the remote terminal to the relay terminal in a request transmission resource different from a transmission resource through which a general discovery message is transmitted.

Meanwhile, the relay terminal may receive, from the remote terminal, the request for transmission of system information in the discovery procedure, and the relay terminal may transmit on-demand system information to the remote terminal in response thereto. In the discovery procedure, the remote terminal may transmit an identifier of the remote terminal to the relay terminal. Accordingly, the relay terminal may receive the identifier of the remote terminal transmitted from the remote terminal, and may identify the remote terminal based on the received identifier of the remote terminal.

Figure 4A:
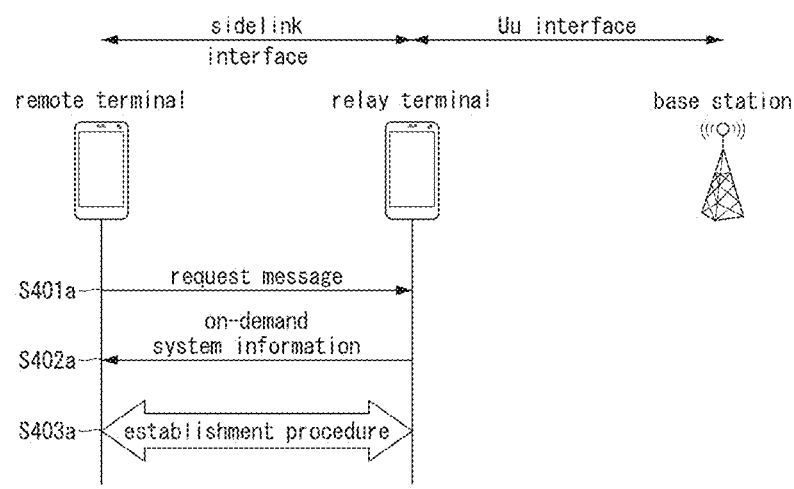
FIG. 4A is a sequence chart illustrating a first exemplary embodiment of a system information acquisition method of a remote terminal.

FIG. 4A is a sequence chart illustrating a first exemplary embodiment of a system information acquisition method of a remote terminal.

Referring to FIG. 4A, in a system information acquisition method of a remote terminal, the remote terminal may transmit, to the relay terminal, a request message including request information for requesting system information (S401a). Accordingly, the relay terminal may receive the request message including the request information from the remote terminal, and the relay terminal may transmit on-demand system information to the remote terminal in response thereto (S402a). The remote terminal may receive the on-demand system information. Thereafter, the remote terminal and the relay terminal may perform an establishment procedure of exchanging control messages based on the system information (S403a).

Figure 4B:
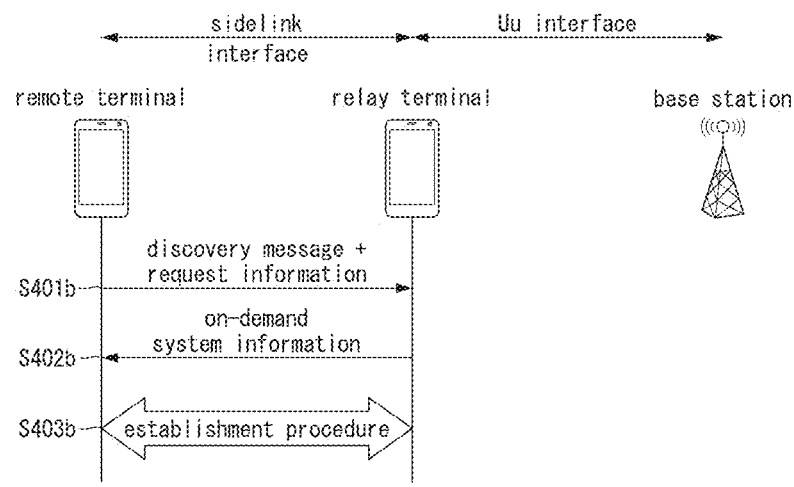
FIG. 4B is a sequence chart illustrating a second exemplary embodiment of a system information acquisition method of a remote terminal.

FIG. 4B is a sequence chart illustrating a second exemplary embodiment of a system information acquisition method of a remote terminal.

Referring to FIG. 4B, in a system information acquisition method of a remote terminal, the remote terminal may transmit, to the relay terminal, a discovery message including request information for requesting system information (S401b). Accordingly, the relay terminal may receive the discovery message including the request information from the remote terminal, and the relay terminal may transmit on-demand system information to the remote terminal in response thereto (S402b). The remote terminal may receive the on-demand system information. Thereafter, the remote terminal and the relay terminal may perform an establishment procedure of exchanging control messages based on the system information (S403b).

Request of System Information for Relaying

The base station may provide managed radio resources so that the relay terminal and the remote terminal associated with or mapped to the relay terminal use the managed radio resources. In addition, the base station may provide the relay terminal and the remote terminal with system information (i.e., parameters) required for the relay terminal and the remote terminal to use the managed radio resources. In particular, the base station may provide the relay terminal and the remote terminal with system information required for sidelink communication operations between the relay terminal and the remote terminal. The base station may periodically provide system information for relaying (hereinafter, 'relay system information') for a sidelink performing a relaying operation to the relay terminal. Alternatively, the base station may provide relay system information for a sidelink performing a relaying operation to the relay terminal according to a request from the relay terminal. Accordingly, the relay terminal may receive, from the base station, the relay system information required in the operation of relaying the remote terminal.

Here, as a method of requesting relay system information from the base station, the relay terminal may use a physical random access channel (PRACH). The base station may designate a specific sequence (i.e., a specific sequence for relaying) among sequences used by the PRACH to be used for requesting relay system information. In this case, the base station may designate the specific sequence of the PRACH used to request relay system information not to overlap with other PRACH sequences used in a Uu interface.

The base station may designate the specific sequence of the PRACH used for requesting relay system information to be different from a specific sequence of a PRACH used for requesting on-demand system information used in the Uu interface. The relay terminal may transmit the specific sequence for requesting relay system information to the base station on a PRACH at a time of requesting relay system information. Accordingly, the base station may receive the specific sequence for requesting relay system information, and may transmit relay system information to the relay terminal in response thereto. Accordingly, the relay terminal may receive the relay system information from the base station.

Meanwhile, as a method of requesting relay system information from the base station, the relay terminal may use a control message. That is, the relay terminal may transmit a control message requesting relay system information to the base station. The base station may receive, from the relay terminal, the control message requesting transmission of relay system information. In addition, the base station may transmit relay system information to the relay terminal in response thereto. Accordingly, the relay terminal may receive the relay system information from the base station.

In this case, the control message transmitted from the relay terminal to the base station may include a message identifier that enables the base station to identify that it is a message requesting relay system information. Accordingly, the relay terminal may transmit the control message including the message identifier for requesting relay system information to the base station. The base station may receive the control message including the message identifier for requesting transmission of relay system information from the relay terminal. Then, the base station may recognize the request for relay system information based on the message identifier, and may transmit relay system information to the relay terminal in response thereto. Accordingly, the relay terminal may receive the relay system information from the base station.

On-Demand System Information Delivery Procedure The relay terminal may be located between the base station and the remote terminal. In this case, the relay terminal may access the base station by using a Uu interface. In addition, the relay terminal may access the remote terminal by using a sidelink interface. In such the structure, the relay terminal may receive, from the remote terminal, request information for requesting on-demand system information from the base station, and deliver it to the base station. Then, the relay terminal may receive on-demand system information for the remote terminal from the base station, and deliver it to the remote terminal.

When the remote terminal needs to receive on-demand system information from the base station, the remote terminal may transmit, to the relay terminal, request information for requesting on-demand system information from the base station. Then, the relay terminal may receive, from the remote terminal, the request information requesting on-demand system information from the base station, and the relay terminal may transmit, to the base station, the request information for requesting on-demand system information. Accordingly, the base station may receive, from the relay terminal, the request information for requesting on-demand system information, and the base station may transmit on-demand system information for the remote terminal to the relay terminal in response thereto. The relay terminal may receive the on-demand system information for the remote terminal from the base station. In addition, the relay terminal may deliver the received on-demand system information for the remote terminal to the remote terminal. The remote terminal may receive the on-demand system information from the relay terminal. As described above, the relay terminal may perform a relay delivery function of the request information for requesting on-demand system information and the on-demand system information. In addition, the relay terminal may not store the request information or the on-demand system information after the relay delivery procedure is completed.

Here, the transmissions of the request information for requesting on-demand system information and the one-demand system information may be performed through control messages defined in the Uu interface and the PC5 sidelink interface, respectively. That is, when the remote terminal needs to receive on-demand system information from the base station, the remote terminal may transmit, to the relay terminal, the request information for requesting on-demand system information from the base station by using a control message of the PC5 interface. Then, the relay terminal may receive, from the remote terminal, the request information for requesting the on-demand system information from the base station. Thereafter, the relay terminal may transmit the request information for requesting on-demand system information to the base station by using a control message of the Uu interface. Accordingly, the base station may receive, from the relay terminal, the request information for requesting on-demand system information, and the base station may transmit on-demand system information for the remote terminal to the relay terminal by using a control message of the Uu interface. The relay terminal may receive the on-demand system information for the remote terminal from the base station. In addition, the relay terminal may deliver the received on-demand system information for the remote terminal to the remote terminal by using a control message of the PC5 interface. The remote terminal may receive the on-demand system information from the relay terminal.

In this manner, the relay terminal may receive, from the remote terminal, the control message requesting transmission of system information from the base station through the PC5 interface. In this case, the relay terminal may convert the control message requesting transmission of system information received from the remote terminal through the PC5 interface into the control message requesting transmission of system information to be transmitted through the Uu interface, and transmit the converted control message to the base station. Additionally, the relay terminal may receive, from the remote terminal, the control message requesting transmission of system information through the PC5 interface. In this case, the relay terminal may transmit the control message requesting transmission of system information received through the PC5 interface to the base station through the Uu interface. Similarly, the relay terminal may receive the control message including the system information from the base station through the Uu interface. In this case, the relay terminal may convert the control message including the system information received through the Uu interface into the control message including the system information to be transmitted through the PC5 interface, and deliver the converted control message to the remote terminal. Additionally, the relay terminal may receive, from the base station, the control message including the system information through the Uu interface. In this case, the relay terminal may transmit the control message including the system information received through the Uu interface to the remote terminal through the PC5 interface.

Alternatively, the relay terminal may operate in a manner of delivering data through the Uu interface and the PC5 sidelink interface. In this case, the relay terminal may exchange control messages through an RRC protocol located in the base station associated with or mapped to the Uu interface and an RRC protocol located in the remote terminal associated with or mapped to the PC5 sidelink interface.

That is, when the remote terminal needs to receive on-demand system information from the base station, the remote terminal may configure request information of requesting on-demand system information from the base station as a control message. In addition, the remote terminal may configure data including the configured control message. The remote terminal may transmit the data including the configured control message to the relay terminal. In this case, the relay terminal may receive the data including the control message, and the relay terminal may transmit data including the received control message to the base station. Accordingly, the base station may receive data the including the control message from the relay terminal, and the base station may obtain the control message from the received data including the control message. The base station may identify the request for transmission of the on-demand system information of the remote terminal based on the obtained control message.

Meanwhile, the base station may configure a control message including on-demand system information according to the request for transmission of the on-demand system information from the remote terminal. The base station may configure data including the control message, and transmit the data including the control message to the relay terminal. In this case, the relay terminal may receive the data including the control message, and the relay terminal may deliver data including the received control message to the remote terminal. Accordingly, the remote terminal may receive the data including the control message from the relay terminal. In addition, the remote terminal may obtain the control message from the received data including the control message. The base station may identify the on-demand system information transmitted by the base station through the acquired control message. In this manner, the control message requesting system information and the control message including the system information may be exchanged between the remote terminal and the base station, and the relay terminal may operate in a manner of relaying the data corresponding to the control messages.

Figure 5:
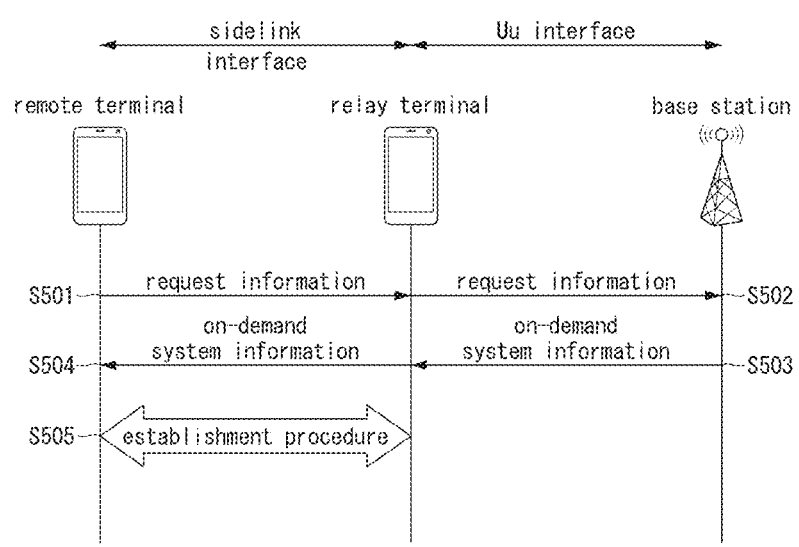
FIG. 5 is a sequence chart illustrating a first exemplary embodiment of an on-demand system information relaying method of a relay terminal.

FIG. 5 is a sequence chart illustrating a first exemplary embodiment of an on-demand system information relaying method of a relay terminal.

Referring to FIG. 5, when it is required to receive on-demand system information from the base station, the remote terminal may transmit, to the relay terminal, request information for requesting on-demand system information from the base station (S501). Then, the relay terminal may receive, from the remote terminal, the request information for requesting on-demand system information from the base station. Thereafter, the relay terminal may transmit, to the base station, request information for requesting on-demand system information from the base station (S502). Accordingly, the base station may receive the request information for requesting on-demand system information from the relay terminal, and the base station may transmit on-demand system information for the remote terminal to the relay terminal in response thereto (S503). The relay terminal may receive the on-demand system information for the remote terminal from the base station. Then, the relay terminal may deliver, to the remote terminal, the received on-demand system information for the remote terminal (S504). The remote terminal may receive the on-demand system information from the relay terminal. Thereafter, the remote terminal and the relay terminal may perform an establishment procedure of exchanging control messages based on the system information (S505).

In this manner, the relay terminal may relay the request information for requesting on-demand system information, which is transmitted from the remote terminal, to the base station, and may relay the on-demand system information transmitted by the base station to the remote terminal.

Sidelink System Information Transmission

The relay terminal may deliver system information to the remote terminal by including the system information in a broadcast-type control message. The relay terminal may configure a broadcast-type control message including the system information and broadcast the broadcast-type control message through a PC5 sidelink. In this case, the relay terminal may periodically broadcast the broadcast-type control message. Alternatively, the relay terminal may broadcast the broadcast-type control message according to a system information request of the remote terminal. Accordingly, the remote terminal may receive the broadcast-type control message including the system information, which is broadcast from the relay terminal. Then, the remote terminal may acquire the system information from the received broadcast-type control message.

Alternatively, the relay terminal may transmit system information to the remote terminal by including the system information in a unicast-type control message. The relay terminal may configure a unicast-type control message including the system information, and may transmit the unicast-type control message to the remote terminal through the PC5 sidelink. As an example, the relay terminal may configure the unicast-type control message as an RRC control message. In this case, the relay terminal may periodically transmit the unicast-type control message. Alternatively, the relay terminal may transmit the unicast-type control message according to a system information request of the remote terminal. Accordingly, the remote terminal may receive the unicast-type control message including the system information, which is transmitted from the relay terminal, and the remote terminal may acquire the system information from the received unicast-type control message.

In this manner, the relay terminal may receive the system information request from the remote terminal, and deliver it to the base station. The relay terminal may receive system information from the base station. The relay terminal may transmit the system information received from the base station to the remote terminal as the broadcast-type control message or the unicast-type control message. A procedure in which the relay terminal requests and acquires system information from the base station may occur independently of the system information request procedure between the remote terminal and the relay terminal. That is, if the relay terminal already has acquired the system information requested by the remote terminal, the relay terminal may immediately deliver the already acquired system information to the remote terminal. In this case, if the relay terminal does not have the system information requested by the remote terminal, the relay terminal may acquire the system information from the base station, and deliver the acquired system information to the remote terminal.

Relay Terminal-Led On-Demand System Information Management

The relay terminal may proactively manage on-demand system information in the sidelink. The relay terminal may request the base station to transmit on-demand system information. When there is a transmission request for on-demand system information from the remote terminal later, the relay terminal may provide the on-demand system information, which has been already received from the base station and stored in the relay terminal, to the remote terminal.

Meanwhile, the base station may change on-demand system information. In this case, the base station may designate and manage a version for each system information so that the changed system information can be distinguished from the previous system information. As such, when the system information is changed, the base station may transmit the changed version of the system information to the relay terminal. In this case, the base station may transmit the changed version of the system information to the relay terminal in the broadcast transmission scheme or the unicast transmission scheme.

The relay terminal may receive the changed version of the system information from the base station, and may identify whether the received version of the system information is the same as the version of the latest stored system information. If the version of the received system information is the same as the version of the latest stored system information, the relay terminal may continue to use the stored system information. On the other hand, if the version of the received system information is different from the version of the stored system information, the relay terminal may perform a procedure for requesting the changed on-demand system information. Accordingly, the base station may transmit the changed on-demand system information to the relay terminal in response thereto. Upon receiving this, the relay terminal may deliver the changed on-demand system information to the remote terminal in response to the request of the remote terminal through the sidelink interface. The relay terminal may store the changed on-demand system information received from the base station, and continue to use the stored on-demand system information.

Figure 6:
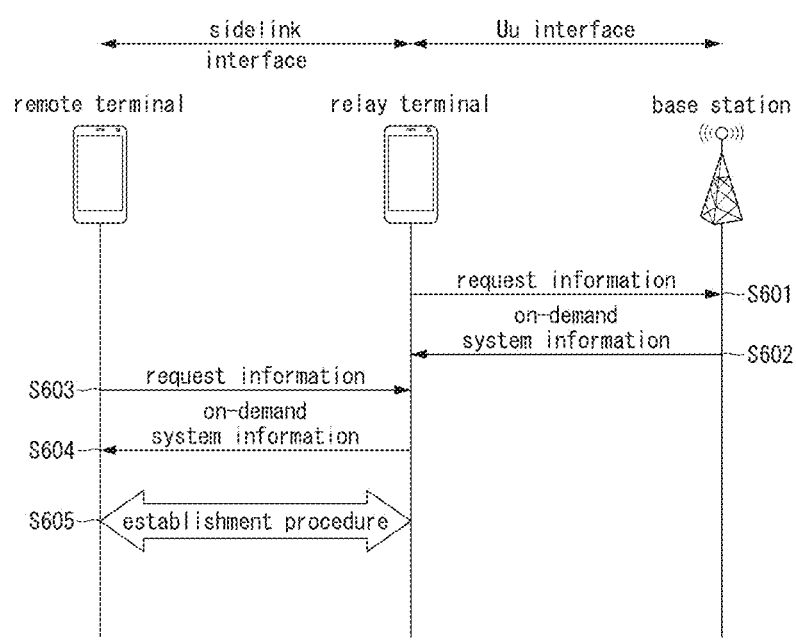
FIG. 6 is a sequence chart illustrating a second exemplary embodiment of an on-demand system information relaying method of a relay terminal.

FIG. 6 is a sequence chart illustrating a second exemplary embodiment of an on-demand system information relaying method of a relay terminal.

Referring to FIG. 6, when on-demand system information is required, the relay terminal may transmit request information for requesting on-demand system information to the base station (S601). Accordingly, the base station may receive, from the relay terminal, the request information for requesting on-demand system information, and the base station may transmit on-demand system information to the relay terminal in response thereto (S602). The relay terminal may receive the on-demand system information from the base station.

Thereafter, when it is required to receive on-demand system information from the base station, the remote terminal may transmit, to the relay terminal, request information for requesting on-demand system information (S603). Then, the relay terminal may receive, from the remote terminal, the request information for requesting on-demand system information. In this case, the relay terminal may determine whether on-demand system information received and stored from the base station corresponds to the on-demand system information requested by the remote terminal. The relay terminal may transmit the on-demand system information to the remote terminal if they match as a result of the determination (S604). The remote terminal may receive the on-demand system information from the relay terminal, and then the remote terminal and the relay terminal may perform an establishment procedure of exchanging control messages based on the system information (S605).

As described above, the relay terminal may receive and store the on-demand system information transmitted from the base station. When the stored on-demand system information is requested by the remote terminal, the relay terminal may deliver the on-demand system information to the remote terminal in response thereto.

Remote Terminal-Led Control on System Information Relay Function of Relay Terminal The remote terminal may be located in the service coverage of the base station. In this case, the remote terminal may directly receive system information provided by the base station from the base station through the Uu interface. In this manner, when the remote terminal directly receives the system information from the base station, the remote terminal may not receive system information transmitted by the relay terminal. In this case, the remote terminal may notify the relay terminal that relaying of system information is unnecessary.

This may be achieved by the remote terminal transmitting a relay stop request to the relay terminal by including the relay stop request in a relay function control message. That is, the remote terminal may transmit the relay function control message including the relay stop request to the relay terminal. Then, the relay terminal may receive the relay function control message including the relay stop request from the remote terminal. In addition, the relay terminal may recognize that relaying of system information transmitted from the base station to the remote terminal is unnecessary based on the relay stop request included in the relay function control message. Accordingly, the relay terminal may no longer relay system information transmitted from the base station to the remote terminal. Meanwhile, in case that the relay terminal transmits system information to remote terminals in the broadcast transmission scheme, the relay terminal may stop system information relaying when there are relay stop requests from all connected remote terminals.

Alternatively, the remote terminal may configure the relay stop request in form of a relay function control field, and transmit the relay stop request by including the relay function control field in a control message different from the relay function control message. That is, the remote terminal may transmit a control message including the relay function control field of the relay stop request to the relay terminal. Then, the relay terminal may receive the control message including the relay function control field of the relay stop request from the remote terminal. In addition, the relay terminal may recognize that the relay function for the remote terminal is unnecessary based on the relay function control field of the relay stop request included in the received control message. Accordingly, the relay terminal may no longer relay system information transmitted from the base station to the remote terminal. Meanwhile, in case that the relay terminal transmits system information to remote terminals in the broadcast transmission scheme, the relay terminal may stop system information relaying when there are relay stop requests from all connected remote terminals.

Meanwhile, while the remote terminal is located in the service coverage of the base station and receives system information directly from the base station, the direct reception of system information from the base station may be stopped. In this case, the remote terminal may need to receive system information from the relay terminal again. Of course, when the remote terminal leaves the service coverage of the base station, the remote terminal may need to receive system information from the relay terminal again.

In this case, the remote terminal may inform the relay terminal that the remote terminal needs to receive system information. That is, the remote terminal may inform the relay terminal that system information transmitted from the base station is not being received through the Uu interface. This may be achieved by the remote terminal configuring a relay initiation request as a relay function control message and transmitting it to the relay terminal. That is, the remote terminal may transmit a relay function control message including the relay initiation request to the relay terminal. Then, the relay terminal may receive the relay function control message including the relay initiation request from the remote terminal. In addition, the relay terminal may recognize that it is required to initiate a relay function for the remote terminal based on the received relay function control message. Accordingly, the relay terminal may start transmitting system information again to the remote terminal. Then, the remote terminal may receive the system information from the relay terminal.

Alternatively, the remote terminal may configure the relay initiation request in form of a relay function control field, and transmit the relay stop request by including the relay function control field in a control message different from the relay function control message. That is, the remote terminal may transmit a control message including the relay function control field of the relay initiation request to the relay terminal. Then, the relay terminal may receive the control message including the relay function control field of the relay initiation request from the remote terminal. In addition, the relay terminal may recognize that the relay function for the remote terminal is necessary based on the relay function control field of the relay initiation request included in the received control message. In this case, the relay terminal may deliver system information to the remote terminal. Meanwhile, in case that the relay terminal transmits system information to remote terminals in the broadcast transmission scheme, the relay terminal may initiate system information relaying when there is a relay initiation request from at least one remote terminal.

Paging Information Reception of Relay Terminal Through Uu Link

The base station may page a relay terminal by transmitting a paging message to the relay terminal when the relay terminal is in the RRC idle state. Accordingly, the relay terminal may receive the paging message. Thereafter, the relay terminal may perform an RRC connection configuration procedure to access the network and exchange data with the base station. Meanwhile, the base station may page the relay terminal by transmitting a paging message to the relay terminal when the relay terminal is in the RRC inactive state. Accordingly, the relay terminal may receive the paging message. Thereafter, the relay terminal may transition to the RRC connected state by performing an RRC connection configuration procedure, and exchange data with the base station. Such the operations may be applied to a configuration in which the relay terminal is a connection termination point.

Meanwhile, the base station may provide the relay terminal with an identifier used for the procedure for paging the relay terminal in the RRC connected state before the relay terminal enters the RRC idle state or the RRC inactive state. The base station may provide a relay terminal identifier A, which is used for paging the relay terminal in the RRC idle state, to the relay terminal. In addition, the base station may provide a relay terminal identifier B, which is used for paging the relay terminal in the RRC inactive state through a radio access network (RAN) paging procedure, to the relay terminal. Here, the relay terminal identifier A may have a form of, for example, a new generation 5G standalone temporary mobile subscriber identity (NG-5G-S-TMSI), and the relay terminal identifier B may have a form of, for example, an inactive (I)-RNTI. Accordingly, the relay terminal may receive the relay terminal identifier A and the relay terminal identifier B from the base station, and may be associated with or mapped to paging occasions (POs) repeated according to a predetermined periodicity (e.g., discontinuous reception (DRX) cycle) by using the relay terminal identifier A and the relay terminal identifier B. Here, the predetermined periodicity may consist of a plurality of paging occasions. The base station may transmit a paging message to the relay terminal in a paging occasion associated with or mapped to the relay terminal identifier provided to the relay terminal at a time of paging the relay terminal. Accordingly, the relay terminal may determine the paging occasion associated with or mapped to the relay terminal identifier, which is to be used for the paging, and the relay terminal may receive the paging message in the corresponding paging operation. Meanwhile, the remote terminal may perform the same paging reception operation performed by the relay terminal in the Uu link.

Paging Remote Terminal Through Sidelink

The remote terminal may access the base station through a sidelink provided by the relay terminal. In this case, the remote terminal may not directly receive a paging message provided by the base station. The remote terminal may move to a new region where the current base station cannot provide a communication service. Then, the remote terminal may perform a procedure of registering with a new base station that provides a communication service in the new region. In addition, the remote terminal may move out of a region where the relay terminal provides a communication service. In this manner, the remote terminal may move to a new region where the current relay terminal cannot provide a communication service. Then, the remote terminal may perform a discovery procedure with a new relay terminal capable of providing a communication service in the new region. In this case, the new relay terminal may transmit a relay terminal identifier to the remote terminal while performing a discovery procedure with the remote terminal. Accordingly, the remote terminal may obtain the relay terminal identifier of the new relay terminal. In the same manner, the remote terminal may deliver the remote terminal identifier to the new relay terminal while performing the discovery procedure. Accordingly, the new relay terminal may obtain the remote terminal identifier of the remote terminal.

Meanwhile, the remote terminal may be connected to the relay terminal through a sidelink in the RRC idle state or the RRC inactive state. The base station may transmit a paging message to page the remote terminal. In this case, when the remote terminal is located outside the communication coverage of the base station, the remote terminal may receive the paging message provided through the Uu interface. As a method for solving this problem, the relay terminal may receive, from the base station, the paging message transmitted to the remote terminal, and identify whether to page the remote terminal based on the received paging message. When paging of the remote terminal is identified in the received paging message, the relay terminal may deliver the paging message to the remote terminal. Then, the relay terminal may activate a sidelink with the paged remote terminal. Meanwhile, the remote terminal may receive the paging message from the relay terminal. In addition, the remote terminal may transmit a response message for the paging message to the relay terminal. The relay terminal may receive the response message of the remote terminal, and deliver it to the base station. Accordingly, the base station may receive the response message from the relay terminal.

Meanwhile, the relay terminal in the RRC idle state or the RRC inactive state may receive a paging massage transmitted to the remote terminal in a paging occasion associated with or mapped to the relay terminal identifier and a paging occasion associated with or mapped to the remote terminal identifier. The relay terminal may receive the paging message in each paging occasion, and the relay terminal may identify the terminal identifier to be paged in the received paging message. If the identified terminal identifier is the relay terminal identifier, the relay terminal may perform an RRC configuration procedure or an activation procedure in response thereto. Alternatively, if the identified terminal identifier may be the remote terminal identifier, and when the sidelink is in an inactive state, the relay terminal may activate the sidelink, and the relay terminal may deliver the paging message to the remote terminal. Accordingly, the remote terminal may receive the paging message from the relay terminal. In addition, the remote terminal may transmit a response message for the paging message to the relay terminal. The relay terminal may receive the response message of the remote terminal and deliver it to the base station. Accordingly, the base station may receive the response message from the relay terminal.

Here, the paging message transmitted by the relay terminal to the remote terminal through the sidelink may be the same as the paging message received by the relay terminal from the base station. Alternatively, the paging message transmitted by the relay terminal to the remote terminal through the sidelink may be a paging message reconfigured for the purpose of delivering the paging message received by the relay terminal from the base station to the remote terminal through the sidelink. In this case, the terminal identifier included in the paging message received by the relay terminal may be the remote terminal identifier, and if the sidelink is in an inactive state, the relay terminal may transmit a message for activating the sidelink to the remote terminal by including paging information in the message. Accordingly, the remote terminal may receive the message including the paging information from the relay terminal, and the remote terminal may transmit a response message for the message including the paging information to the relay terminal. The relay terminal may receive the response message of the remote terminal and deliver it to the base station. Accordingly, the base station may receive the response message from the relay terminal.

Figure 7:
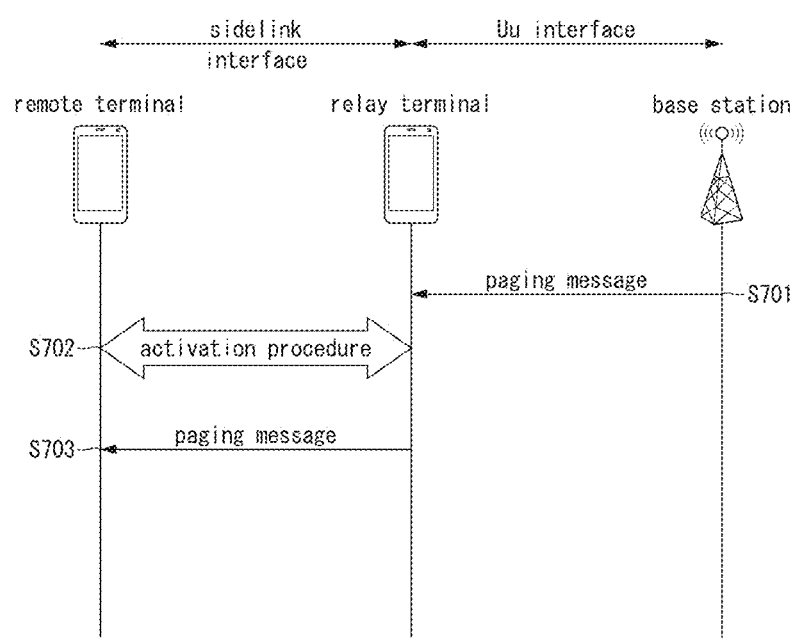
FIG. 7 is a sequence chart illustrating a first exemplary embodiment of a paging message relaying method of a relay terminal.

FIG. 7 is a sequence chart illustrating a first exemplary embodiment of a paging message relaying method of a relay terminal.

Referring to FIG. 7, the base station may transmit a paging message including information on the remote terminal identifier to the relay terminal in order to page the remote terminal. Then, the relay terminal may receive the paging message from the base station (S701). Then, the relay terminal may identify that the paging message is destined for the remote terminal based on the remote terminal identifier included in the received paging message. Accordingly, the relay terminal may activate a sidelink with the remote terminal (S702). Then, the relay terminal may transmit a paging message to the remote terminal through the sidelink (S703). Meanwhile, the remote terminal may receive the paging message from the relay terminal, and the remote terminal may transmit a response message for the paging message to the relay terminal. The relay terminal may receive the response message of the remote terminal and deliver it to the base station. Accordingly, the base station may receive the response message from the relay terminal.

Here, the relay terminal may transmit, to the remote terminal, the same paging message as the paging message received from the base station through the sidelink. Alternatively, the relay terminal may configure a separate paging message newly configured by obtaining the remote terminal identifier from the paging message received from the base station, and transmit the separate paging message to the remote terminal.

Figure 8:
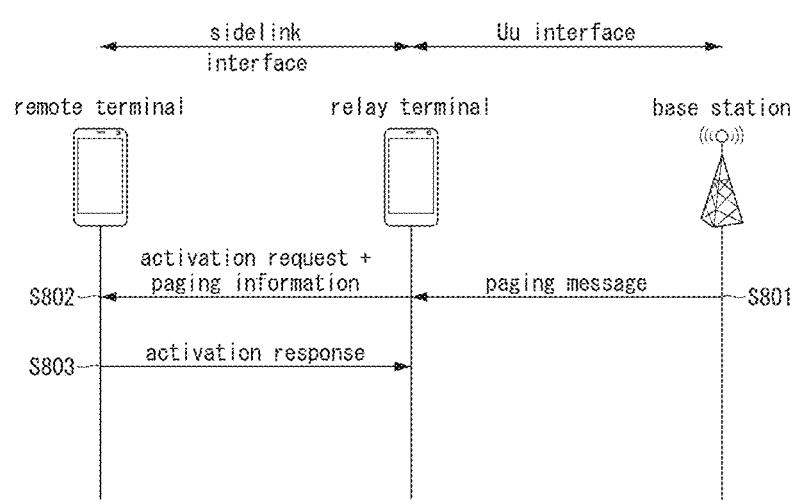
FIG. 8 is a sequence chart illustrating a second exemplary embodiment of a paging message relaying method of a relay terminal.

FIG. 8 is a sequence chart illustrating a second exemplary embodiment of a paging message relaying method of a relay terminal.

Referring to FIG. 8, the base station may transmit a paging message including information on the remote terminal identifier to the relay terminal in order to page the remote terminal (S801). Then, the relay terminal may receive the paging message from the base station. Then, the relay terminal may identify that the paging message is destined for the remote terminal based on the remote terminal identifier included in the received paging message. Accordingly, the relay terminal may activate a sidelink with the remote terminal, and transmit an activation request message including paging information to the remote terminal in order to transmit the paging information (S802). Here, the paging information may include the remote terminal identifier included in the paging message.

Meanwhile, the remote terminal may receive the activation request message including the paging information from the relay terminal. Then, the remote terminal may perform an activation procedure in response to the activation request message, and may transmit an activation response message to the relay terminal (S803). The relay terminal may receive the activation response message from the remote terminal.

Here, the remote terminal may provide information on the remote terminal identifier information to the relay terminal. The relay terminal may receive the information on the remote terminal identifier from the remote terminal. As such, the remote terminal may provide the remote terminal identifier to the relay terminal through the sidelink activated after the sidelink discovery procedure. Meanwhile, the relay terminal may request information on the remote terminal identifier from the base station. The base station may receive, from the relay terminal, the request for transmission of the information on the remote terminal identifier, and the base station may transmit the remote terminal identifier to the relay terminal through the Uu interface. Then, the relay terminal may receive the information on the remote terminal identifier from the base station. Accordingly, the relay terminal may identify the remote terminal identifier in order to identify information on a paging occasion of the remote terminal.

Figure 9:
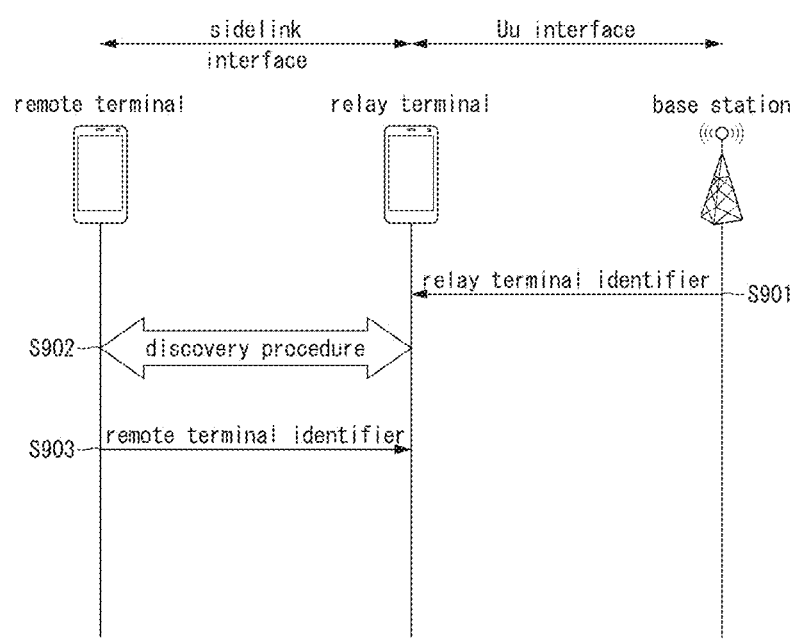
FIG. 9 is a sequence chart illustrating a first exemplary embodiment of a terminal identifier acquisition method of a relay terminal.

FIG. 9 is a sequence chart illustrating a first exemplary embodiment of a terminal identifier acquisition method of a relay terminal.

Referring to FIG. 9, in a method for the relay terminal to obtain a terminal identifier, the base station may transmit the relay terminal identifier to the relay terminal so that the relay terminal receives a paging message (S901). Then, the relay terminal may receive the relay terminal identifier from the base station.

Meanwhile, the remote terminal may perform a discovery procedure (S902), and may transmit the remote terminal identifier to a newly discovered relay terminal through a sidelink (S903). Here, the remote terminal may transmit the remote terminal identifier by configuring a message different from a message used in the discovery procedure. Alternatively, the remote terminal may transmit the remote terminal identifier to the relay terminal by including the remote terminal identifier in a field of the message used in the discovery procedure. Meanwhile, the remote terminal may request the relay terminal to relay a paging message.

Figure 10:
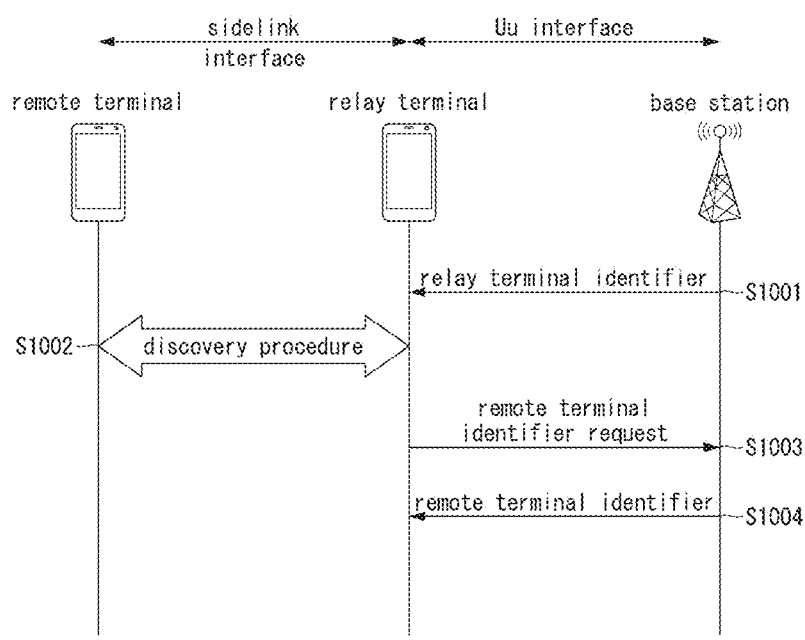
FIG. 10 is a sequence chart illustrating a second exemplary embodiment of a terminal identifier acquisition method of a relay terminal.

FIG. 10 is a sequence chart illustrating a second exemplary embodiment of a terminal identifier acquisition method of a relay terminal.

Referring to FIG. 10, in a method for the relay terminal to obtain a terminal identifier, the base station may transmit the relay terminal identifier to the relay terminal so that the relay terminal receives a paging message (S1001). Then, the relay terminal may receive the relay terminal identifier from the base station.

Meanwhile, the remote terminal may perform a discovery procedure (S1002), and may access a newly discovered relay terminal through a sidelink. As such, when a new remote terminal accesses, the relay terminal may request the base station to transmit a remote terminal identifier for the newly accessed remote terminal (S1003). Then, the base station may receive, from the relay terminal, the request of transmission of the remote terminal identifier. Then, the base station may transmit the remote terminal identifier to the relay terminal so that the relay terminal receives a paging message for the remote terminal (S1004). Then, the relay terminal may receive the remote terminal identifier from the base station. Accordingly, the relay terminal may receive a paging message transmitted from the base station to the remote terminal in a paging occasion of the remote terminal through the Uu interface.

Power Saving of Relay Terminal

As the number of remote terminals managed by the relay terminal increases, the number of paging occasions for which a reception operation should be performed to receive a paging message from the base station may increase. As such, as the paging occasions increase, the relay terminal may perform the reception operation more frequently. When the relay terminal frequently performs the reception operation, the advantage of DRX operations in the RRC idle state or the RRC inactive state for reducing power consumption may be reduced. Accordingly, in order to improve this, the communication system may need to reduce the paging occasions for which the relay terminal should perform the reception operation in order to receive a paging message from the base station.

Meanwhile, the base station may transmit a paging message to the relay terminal in order to page the relay terminal through the Uu interface. In this case, the base station may transmit the paging message to the relay terminal in a paging occasion associated with or mapped to the relay terminal identifier. Also, when the base station transmits a paging message for paging the remote terminal to the relay terminal through the Uu interface, the base station may transmit the paging message to the relay terminal in a paging occasion associated with or mapped to the remote terminal identifier. Accordingly, the relay terminal may receive the paging message in the paging occasion associated with or mapped to the relay terminal identifier and the paging occasion associated with or mapped to the remote terminal identifier. Accordingly, the operations of the relay terminal receiving the paging message may be increased.

To solve this, the base station may transmit, to the relay terminal, a paging message including the remote terminal identifier for paging the remote terminal in a paging occasion associated with or mapped to the relay terminal identifier through the Uu interface. Then, the relay terminal may receive the paging message from the base station in the paging occasion associated with or mapped to the relay terminal identifier. The relay terminal may identify that the paging message is destined for the remote terminal based on the remote terminal identifier in the received paging message. Accordingly, the relay terminal may activate a sidelink with the remote terminal, and transmit the paging message to the remote terminal through the sidelink. As such, the paging occasion of the relay terminal may be determined by the relay terminal identifier irrespective of the remote terminal identifier. Accordingly, the number of paging occasions in which the relay terminal needs to receive the paging message from the base station may be reduced.

Meanwhile, the base station may provide the relay terminal with a paging identifier for relaying (i.e., relay paging identifier) in order to designate a paging occasion in which the relay terminal should perform a reception operation for receiving a paging message destined for the remote terminal through the Uu interface. Then, the relay terminal may receive the relay paging identifier from the base station, and the relay terminal may identify the paging occasion based on the received relay paging identifier.

Meanwhile, the base station may transmit, to the relay terminal, a paging message including the remote terminal identifier for paging the remote terminal in the paging occasion associated with or mapped to the relay paging identifier through the Uu interface. Then, the relay terminal may receive the paging message from the base station in the paging occasion associated with or mapped to the relay paging identifier. The relay terminal may identify that the paging message is destined for the remote terminal based on the remote terminal identifier in the received paging message. Accordingly, the relay terminal may activate a sidelink with the remote terminal, and the relay terminal may transmit a paging message to the remote terminal through the sidelink. In this manner, the paging occasion of the relay terminal may be determined by the relay paging identifier regardless of the remote terminal identifier. Accordingly, the number of paging occasions in which the relay terminal should performs the reception operation to receive the paging message may be reduced. As such, the relay terminal may not perform the reception operation in all paging occasions associated with the remote terminal identifiers provided for the respective remote terminals. Accordingly, the frequency of the reception operation of the relay terminal may be reduced.

Remote Terminal Paging method for power saving of relay terminal

In order to page the remote terminal, the base station may transmit a paging message for paging the remote terminal to the relay terminal in a paging occasion. Accordingly, the relay terminal may receive the paging message for the remote terminal from the base station in a paging occasion for paging the remote terminal. Then, the relay terminal may identify paging information for the remote terminal in the received paging message. Then, the relay terminal may deliver the paging information to the remote terminal. In such a situation, since the relay terminal performs a reception operation in all paging occasions of each remote terminal, power is wasted and power saving cannot be achieved. In such an environment, a power saving method may be needed in order to reduce power wasted in the process in which the relay terminal performs relaying for the remote terminal.

Figure 11:
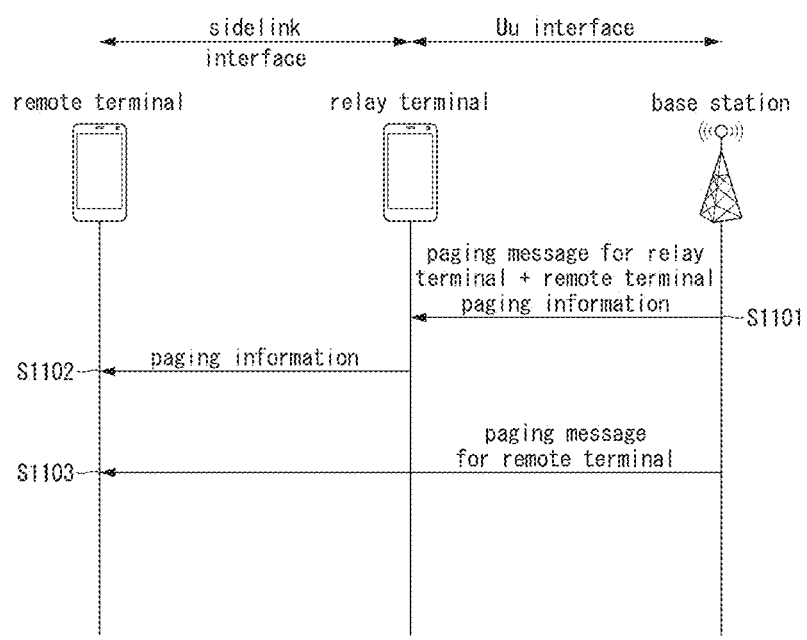
FIG. 11 is a sequence chart illustrating a third exemplary embodiment of a paging message relaying method of a relay terminal.

FIG. 11 is a sequence chart illustrating a third exemplary embodiment of a paging message relaying method of a relay terminal.

Referring to FIG. 11, in a method in which the relay terminal relays a paging message, the base station may transmit paging information for paging the remote terminal to the relay terminal by including the paging information in a paging message for the relay terminal transmitted in a paging occasion of the relay terminal (S1101). Accordingly, the relay terminal may receive the paging message including the paging information for the remote terminal in the paging occasion of the relay terminal. Then, the relay terminal may obtain the paging information for the remote terminal from the received paging message, and transmit the paging information to the remote terminal (S1102). Accordingly, the remote terminal may receive the paging information from the relay terminal.

Meanwhile, the base station may transmit, to the remote terminal, a paging message providing the paging information to the remote terminal in a paging occasion of the remote terminal in order to page the remote terminal (S1103). Accordingly, the remote terminal may separately receive the paging message in the paging occasion of the remote terminal. In this case, the relay terminal may not perform a reception operation for separately receiving the paging message in the paging occasion of the remote terminal.

Meanwhile, the base station may use a remote terminal paging notifier to save power of the relay terminal.

Figure 12:
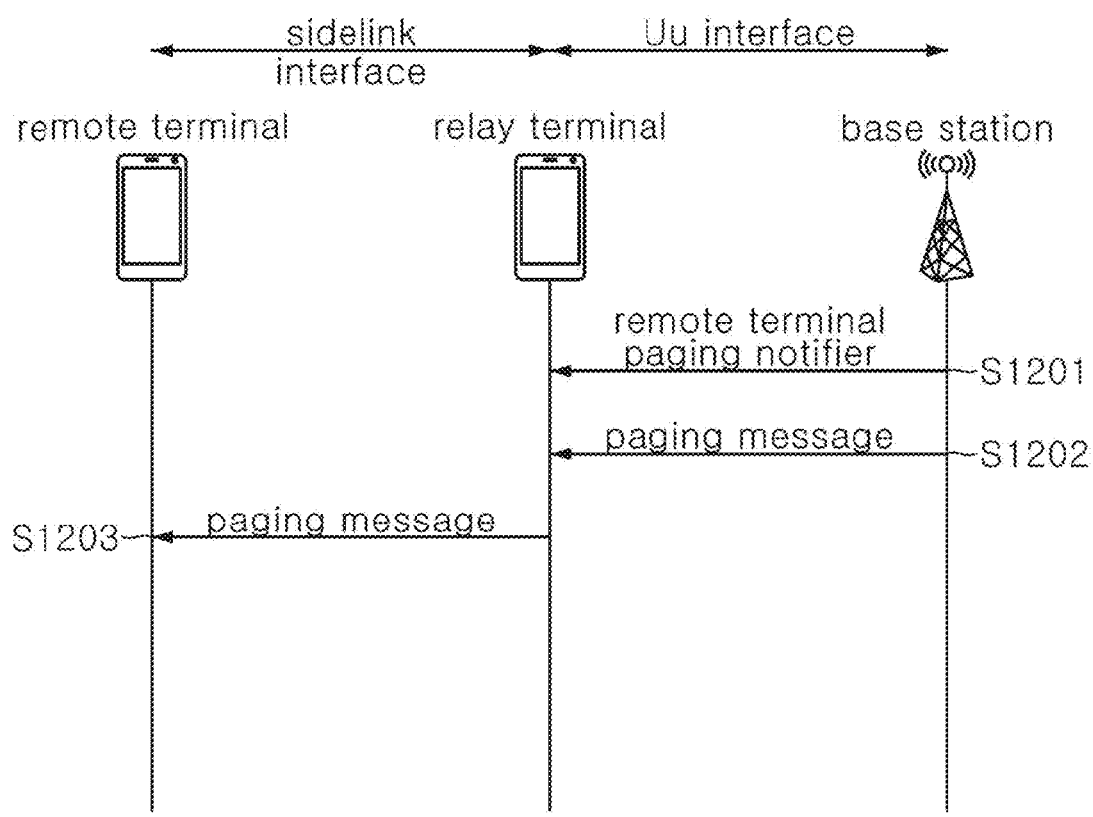
FIG. 12 is a sequence chart illustrating a fourth exemplary embodiment of a paging message relaying method of a relay terminal.

FIG. 12 is a sequence chart illustrating a fourth exemplary embodiment of a paging message relaying method of a relay terminal.

Referring to FIG. 12, in a method in which the relay terminal relays a paging message, the base station may receive a message paging the remote terminal from a network or the like. Then, the base station may transmit a remote terminal paging notifier to the relay terminal associated with or mapped to the remote terminal in a paging occasion of the relay terminal (S1201). Then, the relay terminal may receive the remote terminal paging notifier from the base station. Thereafter, the base station may transmit a paging message to the relay terminal in a paging occasion of the remote terminal (S1202). In this case, since the relay terminal has received the remote terminal paging notifier from the base station, the relay terminal may receive a paging message for paging the remote terminal in a paging occasion related to the remote terminal identifier.

The relay terminal may identify that the paging message is destined for the remote terminal based on the remote terminal identifier in the received paging message. Accordingly, the relay terminal may activate a sidelink with the remote terminal, and transmit a paging message to the remote terminal through the sidelink (S1203). In this manner, since the relay terminal monitors the paging occasion related to the remote terminal identifier only when the remote terminal paging notifier is received, the paging occasions in which the relay terminal should perform a reception operation for receiving the paging message may be reduced.

Here, when the base station configures the remote terminal paging notifier, the remote terminal paging notifier may be configured for each remote terminal to be paged. Accordingly, the remote terminal paging notifier may include a remote terminal identifier for each remote terminal to be paged. The remote terminal paging notifier may include a function value mapped to a remote terminal identifier for each remote terminal. Here, the function value may be a hash value generated by a hash algorithm.

Accordingly, the relay terminal may receive the remote terminal paging notifier including the function value mapped to the remote terminal identifier for each remote terminal. The relay terminal may recognize the function value from the received remote terminal paging notifier, and the relay terminal may identify the remote terminal from the recognized function value. The relay terminal may receive a paging message provided by the base station by performing a reception operation in a paging occasion of the remote terminal associated with the received remote terminal paging notifier. The relay terminal may relay a procedure for paging the remote terminal by using a sidelink with the paged remote terminal. Additionally, the remote terminal paging notifier may include a remoter terminal identifier of a remote terminal has already been paged. Accordingly, the relay terminal may identify the remote terminal identifier of the remote terminal has already been paged based on the remote terminal paging notifier. In this case, the relay terminal may not perform a reception operation in a paging occasion of the identified remote terminal.

Meanwhile, the base station may configure the notifier for each paging occasion when configuring the remote terminal paging notifier. The base station may include paging notification information for paging the remote terminal in the remote terminal paging notifier, for each paging occasion among paging occasions included in a certain period of time. Such the paging notification information may be configured in form of a bitmap corresponding to the respective paging occasions. Accordingly, when the base station transmits a paging message for paging the remote terminal in each paging occasion, the base station may configure paging notification information in a position associated with or mapped to the paging occasion in the remote terminal paging notifier. In addition, the base station may transmit the remote terminal paging notifier including the paging notification information to the relay terminal. Accordingly, the relay terminal may receive the remote terminal paging notifier including the paging notification information. The relay terminal may obtain the paging notification information for each paging occasion from the received remote terminal paging notifier. Accordingly, the relay terminal may perform a paging message reception operation in the paging occasion included in the paging notification information. In this manner, the relay terminal may perform the paging message reception operation of the remote terminal when there is a paging notification in the paging occasion of the related remote terminal.

Meanwhile, the base station may configure the remote terminal paging notifier for relay terminals in common. Here, when the base station configures the remote terminal paging notifier for relay terminals in common, the remote terminal paging notifier may be transmitted in all paging occasions of the relay terminals or in a paging operation negotiated with the relay terminals. In this case, the base station and the relay terminal may exchange information on a paging occasion for transmit the remote terminal paging notifier in the relay terminal configuration procedure, so that the relay terminal and the base station may specify the negotiated paging occasion. When the base station transmits the remote terminal paging notifier in all paging occasions of the relay terminals, the relay terminal may perform a reception operation in the relay terminal's own paging occasion. When the base station transmits the remote terminal paging notifier in the paging occasion negotiated for each relay terminal, the relay terminal may perform a reception operation in the negotiated paging occasion and the relay terminal's own paging occasion. Meanwhile, the base station may configure the remote terminal paging notifier for each relay terminal. In this manner, when the base station configures the remote terminal paging notifier for each relay terminal, the remote terminal paging notifier may be transmitted to the corresponding relay terminal in a paging occasion of the corresponding relay terminal. Accordingly, the relay terminal may receive the remote terminal paging notifier.

Meanwhile, the base station may configure the remote terminal paging notifier for each group of relay terminals. The base station may classify the relay terminals into groups. The base station may transmit information on the classified groups of the relay terminals to the relay terminal in the relay terminal configuration procedure. In this case, the base station may configure a group identifier for each classified relay terminal group, and may transmit the configured group identifier to the corresponding relay terminal. The relay terminal may identify a group to which it belongs by receiving the group identifier.

Meanwhile, the base station may configure a paging message including the remote terminal paging notifiers and the group identifier of the relay terminals belonging to a relay terminal group. The base station may transmit the configured paging message to the relay terminals paging occasions of the relay terminals belonging to the relay terminal group. The relay terminal may receive the paging message and may identify the group identifier in the received paging message. The relay terminal may obtain the remote terminal paging notifier from the paging message when the identified group identifier is the group identifier of the group to which it belongs. If there is the remote terminal paging notifier related to the remote terminal it manages in the remote terminal paging notifiers, the relay terminal may deliver it to the corresponding remote terminal.

Remote Terminal-Led Control on Paging Relay Function of Relay Terminal

The remote terminal may be located in the service coverage of the base station to directly receive paging information provided by the base station through the Uu interface. In this manner, when the remote terminal can receive the paging message through the Uu interface, it may not receive the paging message transmitted by the relay terminal through the PC5 sidelink. In this case, the remote terminal may notify the relay terminal of a status of stopping reception of the paging message transmitted through the PC5 sidelink. In this case, the remote terminal may inform the relay terminal of the status of stopping reception of the paging message by using a relay function control message. Alternatively, the remote terminal may inform the relay terminal of the status of stopping reception of the paging message by using another control message including a paging relay function control field indicating the status of stopping the reception.

Meanwhile, the remote terminal may stop the function of directly receiving the paging message provided by the base station through the Uu interface even when the remote terminal is located in the service coverage of the base station. Alternatively, the remote terminal cannot directly receive the paging message provided by the base station through the Uu interface when the remote terminal leaves the service coverage of the base station. In this case, the remote terminal may request transmission of the paging message to the relay terminal. Upon receiving the request, the relay terminal may resume relaying of the paging message.

Method for Relay Terminal to Obtain Paging Occasion of Remote Terminal

The relay terminal may receive a paging message transmitted from the base station to the remote terminal, and relay and transmit paging information to the remote terminal. To this end, the relay terminal may need to manage a paging occasion of the remote terminal and the remote terminal identifier thereof. To this end, the remote terminal may provide the relay terminal with information on the paging occasion for observing the paging message and information on the remote terminal identifier for identifying the remote terminal in the signaling procedure for transitioning to the RRC idle state or RRC inactive state. Accordingly, the relay terminal may receive, from the remote terminal, the information on the paging occasion for observing the paging message and the information on the remote terminal identifier for identifying the remote terminal, and manage them. In more detail, the information on the paging occasion provided by the remote terminal to the relay terminal may include specific DRX cycle information of the remote terminal. Here, the relay terminal may transmit the remote terminal identifier received from the remote terminal to the base station. In this case, the relay terminal may transmit the remote terminal identifier to the base station by using a dedicated RRC message. Accordingly, the base station may receive the remote terminal identifier from the relay terminal. As a result, the base station may determine to which relay terminal the remote terminal is connected. Meanwhile, the base station may provide, to the relay terminal, information on the paging occasion for observing the paging message transmitted to the remote terminal and information on the remote terminal identifier for identifying the remote terminal. Accordingly, the relay terminal may receive, from the base station, the information on the paging occasion for observing the paging message and the information on the remote terminal identifier for identifying the remote terminal, and may manage them. Specifically, the information on the paging occasion provided by the base station to the relay terminal may include common DRX cycle information.

In this manner, the remote terminal may provide the information on the remote terminal identifier to the relay terminal so that the relay terminal obtains the information on the paging occasion for observing the paging message. The base station may also provide the information on the remote terminal identifier to the relay terminal so that the relay terminal obtains the information on the paging occasion for observing the paging message. In this manner, the relay terminal may receive the information on the remote terminal identifier from the remote terminal or the base station. In this case, the relay terminal may determine the paging occasion of the remote terminal based on the remote terminal identifier, and may perform a reception operation of the paging message in the determined paging occasion. More specifically, the relay terminal may determine the paging occasion of the remote terminal by using the remote terminal identifier and the common DRX cycle received from the base station, and may perform a reception operation of the paging message in the determined paging occasion. Alternatively, the relay terminal may determine the paging occasion of the remote terminal by using the remote terminal identifier and the specific DRX cycle of the remote terminal received from the remote terminal, and may perform a reception operation of the paging message in the determined paging occasion.

Meanwhile, the relay terminal may identify the remote terminal identifier when the paging message is received in the paging occasion. In this case, if the remote terminal identifier is included in the paging message, the relay terminal may relay and transmit the paging information to the remote terminal. As a method for relaying the paging information by the relay terminal, at least one of a unicast transmission scheme, a broadcast transmission scheme, and a groupcast transmission scheme may be used.

On the other hand, the relay terminal may manage only the paging occasion of the remote terminal. To this end, the remote terminal may provide the relay terminal with information on the paging occasion for observing the paging message in the signaling procedure for transitioning to the RRC idle state or the RRC inactive state. Accordingly, the relay terminal may receive information on the paging occasion for observing the paging message from the remote terminal, and manage it. On the other hand, the base station may provide the relay terminal with information on the paging occasion for observing the paging message transmitted to the remote terminal as a destination. Accordingly, the relay terminal may receive the information on the paging occasion for observing the paging message destined for the remote terminal from the base station, and manage it.

In this case, since the relay terminal does not manage the remote terminal identifier, when the paging message is received in the paging occasion for the paging message destined for the remote terminal, the remote terminal cannot identify for which remote terminal the paging message is. Accordingly, the relay terminal may transmit the paging message to all remote terminals managed by the remote terminal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a relay terminal for relaying radio communication between a base station and a remote terminal, the operation method comprising:
   recognizing a relay request of the remote terminal for system information provided by the base station;
   acquiring the system information from the base station; and
   transmitting the system information to the remote terminal,
   wherein the recognizing of the relay request of the remote terminal comprises:
   receiving, from the base station, relay request identification information capable of identifying the relay request of the remote terminal for the system information;
   receiving, from the remote terminal, a discovery message including the relay request identification information; and
   recognizing the relay request for the system information by acquiring the relay request identification information from the received discovery message.

2. The operation method according to claim 1, wherein the recognizing of the relay request of the remote terminal comprises:
   receiving, from the remote terminal, a request message requesting relaying of the system information; and
   recognizing the relay request for the system information from the received request message.

3. The operation method according to claim 1, wherein the relay request identification information is an identifier for a request logical channel used by the remote terminal to transmit the discovery message to request transmission of the system information.

4. The operation method according to claim 1, wherein the relay request identification information is information on a request discovery resource used by the remote terminal to transmit the discovery message to request transmission of the system information.

5. The operation method according to claim 1, wherein the acquiring of the system information from the base station comprises:
   requesting the base station to transmit the system information; and
   receiving, from the base station, the system information in response to the transmission request.

6. The operation method according to claim 5, wherein the requesting the base station to transmit the system information comprises:
   selecting a first physical random access channel (PRACH) sequence requesting transmission of the system information, which is designated by the base station, among PRACH sequences; and
   transmitting the first PRACH sequence to the base station on a PRACH.

7. The operation method according to claim 1, further comprising:
   receiving, from the remote terminal, a relay stop request for the system information; and
   stopping transmission of the system information according to the relay stop request.

8. A relay terminal for relaying radio communication between a base station and a remote terminal in a communication system, the relay terminal comprising:
   a processor;
   a memory electronically communicating with the processor; and
   instructions stored in the memory,
   wherein when executed by the processor, the instructions cause the relay terminal to:
   recognize a relay request of the remote terminal for system information provided by the base station;
   acquire the system information from the base station; and
   transmit the system information to the remote terminal,
   wherein in the recognizing of the relay request of the remote terminal, the instructions cause the relay terminal to:
   receive, from the base station, relay request identification information capable of identifying the relay request of the remote terminal for the system information;
   receive, from the remote terminal, a discovery message including the relay request identification information; and
   recognize the relay request for the system information by acquiring the relay request identification information from the received discovery message.

9. The relay terminal according to claim 8, wherein in the recognizing of the relay request of the remote terminal, the instructions cause the relay terminal to:
   receive, from the remote terminal, a request message requesting relaying of the system information; and
   recognize the relay request for the system information from the received request message.

10. The relay terminal according to claim 8, wherein the relay request identification information is an identifier for a request logical channel used by the remote terminal to transmit the discovery message to request transmission of the system information.

11. The relay terminal according to claim 8, wherein the relay request identification information is information on a request discovery resource used by the remote terminal to transmit the discovery message to request transmission of the system information.

* * * * *